United States Patent
Kuna et al.

(10) Patent No.: US 11,720,149 B2
(45) Date of Patent: Aug. 8, 2023

(54) ELECTRONIC DEVICE HOUSING WITH INTEGRATED ANTENNA

(71) Applicant: Apple Inc., Cupertino, CA (US)

(72) Inventors: Melody L. Kuna, Palo Alto, CA (US); Carlo Catalano, Capitola, CA (US); Lee B. Hamstra, Mountain View, CA (US); Ross Errett, Cupertino, CA (US); Devin Williams, Cupertino, CA (US); Florence W. Ow, Los Altos Hills, CA (US); Alex Chung Lap Yeung, San Francisco, CA (US); Carli Oster, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/848,214

(22) Filed: Jun. 23, 2022

(65) Prior Publication Data

US 2022/0317740 A1     Oct. 6, 2022

Related U.S. Application Data

(63) Continuation of application No. 16/903,110, filed on Jun. 16, 2020, now Pat. No. 11,379,010, which is a
(Continued)

(51) Int. Cl.
*H01Q 1/22*     (2006.01)
*G06F 1/16*     (2006.01)
(Continued)

(52) U.S. Cl.
CPC .......... *G06F 1/1656* (2013.01); *G06F 1/1626* (2013.01); *G06F 3/044* (2013.01); *H01Q 1/2258* (2013.01); *H01Q 1/243* (2013.01)

(58) Field of Classification Search
CPC .... H01Q 1/22; H01Q 1/24; G06F 1/16; G06F 3/04
See application file for complete search history.

(56) References Cited

U.S. PATENT DOCUMENTS

| | | | |
|---|---|---|---|
| 4,106,839 | A | 8/1978 | Cooper |
| 4,256,412 | A | 3/1981 | Tybus et al. |
| | | (Continued) | |

FOREIGN PATENT DOCUMENTS

| | | |
|---|---|---|
| CN | 101087500 | 12/2007 |
| CN | 101350849 | 1/2009 |
| | (Continued) | |

OTHER PUBLICATIONS

Author Unknown, "Improved Touchscreen Products," Research Disclosure, Kenneth Mason Publications, Hampshire, UK, GB, vol. 428, No. 53, Dec. 1, 1999.
(Continued)

*Primary Examiner* — Andrea Lindgren Baltzell
(74) *Attorney, Agent, or Firm* — Brownstein Hyatt Farber Schreck, LLP

(57) ABSTRACT

An electronic device may include a display, a housing member at least partially surrounding the display and including a first segment defining a first portion of an exterior surface of the electronic device, a second segment defining a second portion of the exterior surface of the electronic device and configured to function as an antenna, and a bridge segment structurally and conductively coupling the first segment to the second segment. The electronic device may also include a molded element positioned between the first segment and the second segment and defining a third portion of the exterior surface of the electronic device.

20 Claims, 18 Drawing Sheets

Related U.S. Application Data continuation of application No. 16/183,591, filed on Nov. 7, 2018, now Pat. No. 10,705,570.

(60) Provisional application No. 62/725,227, filed on Aug. 30, 2018.

(51) Int. Cl.
*G06F 3/044* (2006.01)
*H01Q 1/24* (2006.01)

(56) References Cited

U.S. PATENT DOCUMENTS

| | | | |
|---|---|---|---|
| 4,855,174 | A | 8/1989 | Kamamoto et al. |
| 4,989,622 | A | 2/1991 | Kozuka et al. |
| 5,055,347 | A | 10/1991 | Bacon, Jr. |
| 5,512,374 | A | 4/1996 | Wallace et al. |
| 6,061,104 | A | 5/2000 | Evanicky et al. |
| 6,093,887 | A | 7/2000 | Ponto et al. |
| 6,189,938 | B1 | 2/2001 | Nakadaira et al. |
| 6,278,873 | B1 | 8/2001 | Itakura et al. |
| 6,288,330 | B1 | 9/2001 | Chen |
| 6,359,768 | B1 | 3/2002 | Eversley et al. |
| 6,392,873 | B1 | 5/2002 | Honda |
| 6,424,338 | B1 | 7/2002 | Anderson et al. |
| 6,442,826 | B1 | 9/2002 | Staudt et al. |
| 6,473,069 | B1 | 10/2002 | Gerpheide |
| 6,483,024 | B1 | 11/2002 | Smithson et al. |
| 6,589,891 | B1 | 7/2003 | Rast |
| 6,654,256 | B2 | 11/2003 | Gough |
| 6,671,160 | B2 | 12/2003 | Hayden |
| 6,940,731 | B2 | 9/2005 | Davis et al. |
| 6,996,425 | B2 | 2/2006 | Watanabe |
| 7,048,242 | B2 | 5/2006 | Oddsen, Jr. |
| 7,436,653 | B2 | 10/2008 | Yang et al. |
| 7,491,900 | B1 | 2/2009 | Peets et al. |
| 7,586,753 | B2 | 9/2009 | Lu |
| 7,604,377 | B2 | 10/2009 | Yu et al. |
| 7,755,913 | B2 | 7/2010 | He |
| 7,829,812 | B2 | 11/2010 | Tolbert et al. |
| 7,920,904 | B2 | 4/2011 | Kim et al. |
| 7,986,525 | B2 | 7/2011 | Wang |
| 8,066,233 | B2 | 11/2011 | Fujikawa et al. |
| 8,092,897 | B2 | 1/2012 | Honma et al. |
| 8,101,859 | B2 | 1/2012 | Zadesky |
| 8,164,898 | B2 | 4/2012 | Lin et al. |
| D660,193 | S | 5/2012 | Neuner |
| 8,195,244 | B2 | 6/2012 | Smoyer et al. |
| 8,199,488 | B2 | 6/2012 | Zou et al. |
| 8,358,513 | B2 | 1/2013 | Kim et al. |
| 8,396,521 | B2 | 3/2013 | Horimoto et al. |
| 8,456,847 | B2 | 6/2013 | Hwang et al. |
| 8,509,863 | B2 | 8/2013 | Vedurmudi et al. |
| 8,553,907 | B2 | 10/2013 | Thomason et al. |
| 8,558,977 | B2 | 10/2013 | Gettemy et al. |
| 8,587,935 | B2 | 11/2013 | Lee |
| 8,654,524 | B2 | 2/2014 | Pance et al. |
| 8,665,236 | B2 | 3/2014 | Myers |
| 8,675,359 | B2 | 3/2014 | Chen |
| 8,681,115 | B2 | 3/2014 | Kurita |
| 8,744,529 | B2 | 6/2014 | Freund et al. |
| 8,773,848 | B2 | 7/2014 | Russell-Clarke et al. |
| 8,824,140 | B2 | 9/2014 | Prest et al. |
| 8,974,924 | B2 | 3/2015 | Weber et al. |
| 8,975,540 | B2 | 3/2015 | Mareno et al. |
| 9,007,748 | B2 | 4/2015 | Jarvis |
| 9,086,748 | B2 | 7/2015 | Nam et al. |
| 9,124,676 | B2 | 9/2015 | Allore et al. |
| 9,135,944 | B2 | 9/2015 | Jenks |
| 9,162,519 | B2 | 10/2015 | Suehiro et al. |
| 9,173,306 | B2 | 10/2015 | Lim et al. |
| 9,192,072 | B2 | 11/2015 | Shin et al. |
| 9,203,463 | B2 | 12/2015 | Asrani et al. |
| 9,218,116 | B2 | 12/2015 | Benko et al. |
| 9,250,659 | B2 | 2/2016 | Tsai et al. |
| 9,390,869 | B2 | 7/2016 | Lee et al. |
| 9,429,997 | B2 | 8/2016 | Myers et al. |
| 9,448,631 | B2 | 9/2016 | Winter et al. |
| 9,489,054 | B1 | 11/2016 | Sumsion et al. |
| 9,532,723 | B2 | 1/2017 | Kim et al. |
| 9,621,218 | B1 | 4/2017 | Glickman et al. |
| 9,642,241 | B2 | 5/2017 | Huitema et al. |
| 9,654,164 | B2 | 5/2017 | Irci et al. |
| 9,740,237 | B2 | 8/2017 | Moore et al. |
| 9,804,635 | B2 | 10/2017 | Kim et al. |
| 9,826,649 | B2 | 11/2017 | Narajowski et al. |
| 9,898,903 | B2 | 2/2018 | Khoshkava et al. |
| 9,939,784 | B1 | 4/2018 | Berardinelli et al. |
| 9,955,603 | B2 | 4/2018 | Kiple et al. |
| 10,013,075 | B2 | 7/2018 | Shipman |
| 10,042,442 | B2 | 8/2018 | Kwak |
| 10,110,267 | B2 | 10/2018 | Kim et al. |
| 10,321,590 | B2 | 6/2019 | Cater et al. |
| 10,424,765 | B2 | 9/2019 | Hwang et al. |
| 10,468,753 | B2 | 11/2019 | Kim et al. |
| 10,656,714 | B2 | 5/2020 | Ligtenberg et al. |
| 10,705,570 | B2 | 7/2020 | Kuna et al. |
| 10,871,828 | B2 | 12/2020 | Ligtenberg et al. |
| 10,915,151 | B2 | 2/2021 | Silvanto et al. |
| 11,099,649 | B2 | 8/2021 | Ligtenberg et al. |
| 11,133,572 | B2 | 9/2021 | Zhang et al. |
| 11,175,769 | B2 | 11/2021 | Prest et al. |
| 11,189,909 | B2 | 11/2021 | Leutheuser et al. |
| 11,258,163 | B2 | 2/2022 | Froese et al. |
| 11,379,010 | B2 | 7/2022 | Kuna et al. |
| 2002/0006687 | A1 | 1/2002 | Lam |
| 2002/0072335 | A1 | 6/2002 | Watanabe |
| 2002/0130981 | A1* | 9/2002 | Ma .................. F16M 11/10 348/843 |
| 2004/0190239 | A1 | 9/2004 | Weng |
| 2005/0140565 | A1 | 6/2005 | Krombach |
| 2006/0203124 | A1 | 9/2006 | Park et al. |
| 2007/0195495 | A1 | 8/2007 | Kim et al. |
| 2007/0229702 | A1 | 10/2007 | Shirono et al. |
| 2007/0287512 | A1 | 12/2007 | Kilpi et al. |
| 2008/0018475 | A1 | 1/2008 | Breed et al. |
| 2008/0084384 | A1 | 4/2008 | Gregorio et al. |
| 2008/0174037 | A1 | 7/2008 | Chen |
| 2009/0003141 | A1 | 1/2009 | Ozawa et al. |
| 2009/0041984 | A1 | 2/2009 | Mayers et al. |
| 2010/0061044 | A1 | 3/2010 | Zou et al. |
| 2010/0105452 | A1 | 4/2010 | Shin et al. |
| 2010/0137043 | A1 | 6/2010 | Horimoto et al. |
| 2010/0151925 | A1 | 6/2010 | Vedurmudi et al. |
| 2010/0157515 | A1 | 6/2010 | Tseng et al. |
| 2010/0265182 | A1 | 10/2010 | Ball et al. |
| 2010/0302016 | A1 | 12/2010 | Zaborowski et al. |
| 2010/0308998 | A1 | 12/2010 | Hesch, Jr. et al. |
| 2010/0315399 | A1 | 12/2010 | Davis et al. |
| 2011/0038114 | A1 | 2/2011 | Pance et al. |
| 2011/0047459 | A1 | 2/2011 | Van Der Westhuizen |
| 2011/0065479 | A1 | 3/2011 | Nader |
| 2011/0091051 | A1 | 4/2011 | Thomason et al. |
| 2011/0095994 | A1 | 4/2011 | Birnbaum |
| 2011/0205169 | A1 | 8/2011 | Yasutake et al. |
| 2012/0009983 | A1 | 1/2012 | Mow et al. |
| 2012/0069517 | A1 | 3/2012 | Prest et al. |
| 2012/0088072 | A1 | 4/2012 | Pawloski et al. |
| 2012/0094594 | A1 | 4/2012 | Rofougaran et al. |
| 2012/0097412 | A1 | 4/2012 | Wennemer et al. |
| 2012/0175165 | A1 | 7/2012 | Merz et al. |
| 2012/0212424 | A1 | 8/2012 | Sharma et al. |
| 2012/0236477 | A1 | 9/2012 | Weber |
| 2012/0268412 | A1 | 10/2012 | Cruz-Hernandez et al. |
| 2012/0274575 | A1 | 11/2012 | Solomon et al. |
| 2012/0327008 | A1 | 12/2012 | Kurita |
| 2013/0051000 | A1 | 2/2013 | Yu et al. |
| 2013/0076649 | A1 | 3/2013 | Myers et al. |
| 2013/0273295 | A1* | 10/2013 | Kenney .................. B29C 70/48 264/261 |
| 2013/0308282 | A1 | 11/2013 | Shin et al. |
| 2014/0015773 | A1 | 1/2014 | Loeffler |
| 2014/0031093 | A1 | 1/2014 | Song et al. |
| 2014/0139450 | A1 | 5/2014 | Levesque et al. |

(56) References Cited

U.S. PATENT DOCUMENTS

| | | |
|---|---|---|
| 2014/0288438 A1 | 9/2014 | Venkatraman et al. |
| 2014/0311767 A1 | 10/2014 | Merz et al. |
| 2014/0347799 A1 | 11/2014 | Ono et al. |
| 2014/0368455 A1 | 12/2014 | Croisonnier et al. |
| 2015/0001104 A1 | 1/2015 | Kim et al. |
| 2015/0062419 A1 | 3/2015 | Hooton et al. |
| 2015/0090571 A1 | 4/2015 | Leong et al. |
| 2015/0109223 A1 | 4/2015 | Kessler et al. |
| 2015/0124401 A1 | 5/2015 | Prest et al. |
| 2015/0171916 A1 | 6/2015 | Asrani et al. |
| 2015/0183185 A1 | 7/2015 | Chang |
| 2015/0185946 A1 | 7/2015 | Fourie |
| 2015/0255853 A1 | 9/2015 | Kwong et al. |
| 2015/0364820 A1 | 12/2015 | Dong et al. |
| 2016/0029899 A1 | 2/2016 | Kim et al. |
| 2016/0055729 A1 | 2/2016 | Maddox et al. |
| 2016/0064820 A1 | 3/2016 | Kim et al. |
| 2016/0098016 A1 | 4/2016 | Ely et al. |
| 2016/0098107 A1 | 4/2016 | Morrell et al. |
| 2016/0103544 A1 | 4/2016 | Filiz et al. |
| 2016/0147257 A1 | 5/2016 | Yamazaki |
| 2016/0255944 A1 | 9/2016 | Baranski et al. |
| 2016/0270247 A1 | 9/2016 | Jones et al. |
| 2016/0308563 A1 | 10/2016 | Ouyang et al. |
| 2016/0316574 A1 | 10/2016 | Chang et al. |
| 2016/0327980 A1 | 11/2016 | Farahani et al. |
| 2016/0327986 A1 | 11/2016 | Farahani et al. |
| 2017/0010771 A1 | 1/2017 | Bernstein et al. |
| 2017/0038793 A1 | 2/2017 | Kallman |
| 2017/0048495 A1 | 2/2017 | Scalisi et al. |
| 2017/0094804 A1 | 3/2017 | Brodsky et al. |
| 2017/0104261 A1 | 4/2017 | Wong et al. |
| 2017/0230073 A1 | 8/2017 | Youn et al. |
| 2017/0264722 A1 | 9/2017 | Zhong |
| 2017/0303048 A1 | 10/2017 | Hooton et al. |
| 2018/0020208 A1 | 1/2018 | Woo et al. |
| 2018/0026341 A1 | 1/2018 | Mow et al. |
| 2018/0026353 A1 | 1/2018 | Tseng et al. |
| 2018/0077328 A1 | 3/2018 | Park et al. |
| 2018/0198212 A1 | 7/2018 | Rodriguez |
| 2018/0210515 A1 | 7/2018 | Lyles et al. |
| 2018/0213660 A1 | 7/2018 | Prest et al. |
| 2018/0284845 A1 | 10/2018 | Honma et al. |
| 2019/0083715 A1 | 3/2019 | Redmond et al. |
| 2019/0128669 A1 | 5/2019 | Nobayashi et al. |
| 2019/0361543 A1 | 11/2019 | Zhang |
| 2019/0377385 A1 | 12/2019 | Bushnell |
| 2020/0058992 A1 | 2/2020 | Wu et al. |
| 2020/0073445 A1* | 3/2020 | Kuna ............... H01Q 21/28 |
| 2020/0278747 A1 | 9/2020 | Ligtenberg et al. |
| 2020/0314567 A1 | 10/2020 | Shriner et al. |
| 2020/0328499 A1 | 10/2020 | O'Driscoll et al. |
| 2020/0409023 A1 | 12/2020 | Kazuo et al. |
| 2021/0149458 A1 | 5/2021 | Silvanto et al. |
| 2021/0234403 A1 | 7/2021 | Ku et al. |
| 2021/0353226 A1 | 11/2021 | Hiemstra et al. |
| 2022/0004837 A1 | 1/2022 | Perkins et al. |
| 2022/0006176 A1 | 1/2022 | Froese et al. |
| 2022/0057885 A1 | 2/2022 | Prest et al. |
| 2022/0059928 A1 | 2/2022 | Leutheuser et al. |

FOREIGN PATENT DOCUMENTS

| | | |
|---|---|---|
| CN | 101753655 | 6/2010 |
| CN | 102159045 | 8/2011 |
| CN | 102405453 | 4/2012 |
| CN | 202281978 | 6/2012 |
| CN | 202735925 | 2/2013 |
| CN | 102984904 | 3/2013 |
| CN | 103168280 | 6/2013 |
| CN | 203054674 | 7/2013 |
| CN | 103327758 | 9/2013 |
| CN | 103390793 | 11/2013 |
| CN | 203416294 | 1/2014 |
| CN | 103681061 | 3/2014 |
| CN | 103777765 | 5/2014 |
| CN | 104427048 | 3/2015 |
| CN | 104582379 | 4/2015 |
| CN | 104742308 | 7/2015 |
| CN | 105228966 | 1/2016 |
| CN | 105892568 | 8/2016 |
| CN | 107221506 | 9/2017 |
| CN | 107275751 | 10/2017 |
| CN | 107735903 | 2/2018 |
| CN | 207216299 | 4/2018 |
| CN | 108400425 | 8/2018 |
| CN | 108594622 | 9/2018 |
| CN | 108594623 | 9/2018 |
| CN | 112532263 | 3/2021 |
| CN | 112799294 | 5/2021 |
| EP | 2565742 | 3/2013 |
| EP | 2843501 | 3/2015 |
| EP | 2993730 | 3/2016 |
| EP | 3144768 | 3/2017 |
| EP | 3438786 | 2/2019 |
| GB | 2516439 | 1/2015 |
| GB | 2529885 | 3/2016 |
| JP | S58151619 | 9/1983 |
| JP | H61039144 | 2/1986 |
| JP | H05022023 | 1/1993 |
| JP | H10102265 | 4/1998 |
| JP | H63249697 | 10/1998 |
| JP | 2001216077 | 8/2001 |
| JP | 20023431 | 11/2002 |
| JP | 2004272690 | 9/2004 |
| JP | 2006243812 | 9/2006 |
| JP | 2007072375 | 3/2007 |
| JP | 2011014149 | 1/2011 |
| JP | 2011159276 | 8/2011 |
| JP | 2011239139 | 11/2011 |
| JP | 2011248888 | 12/2011 |
| JP | 2012/019526 | 1/2012 |
| JP | 2012027592 | 2/2012 |
| JP | 2012222553 | 11/2012 |
| JP | 2013508818 | 3/2013 |
| JP | 2014501070 | 1/2014 |
| JP | 2014512879 | 5/2014 |
| JP | 2014186075 | 10/2014 |
| JP | 2015031952 | 2/2015 |
| JP | 2019537909 | 12/2019 |
| KR | 20110049416 | 5/2011 |
| KR | 20110076951 | 7/2011 |
| KR | 20130096048 | 8/2013 |
| KR | 20150012312 | 2/2015 |
| KR | 20160019833 | 2/2016 |
| KR | 20160052275 | 5/2016 |
| KR | 20160134504 | 11/2016 |
| KR | 20180025126 | 3/2018 |
| TW | 201129285 | 8/2011 |
| TW | 201532835 | 9/2015 |
| TW | 201701119 | 1/2017 |
| WO | WO2009/002605 | 12/2008 |
| WO | WO2009/049331 | 4/2009 |
| WO | WO2009/129123 | 10/2009 |
| WO | WO2011/130849 | 10/2011 |
| WO | WO2012/006152 | 1/2012 |
| WO | WO2012/129247 | 9/2012 |
| WO | WO2014/037945 | 3/2014 |
| WO | WO2015/153701 | 10/2015 |
| WO | WO2016/039803 | 3/2016 |
| WO | WO2016/053901 | 4/2016 |
| WO | WO2018/013573 | 1/2018 |
| WO | WO2018/090295 | 5/2018 |
| WO | WO2018/142132 | 8/2018 |

OTHER PUBLICATIONS

Author Unknown, "Smart Watch—New Fashion Men/women Bluetooth Touch Screen Smart Watch Wrist Wrap Watch Phone," https://www.fargoshopping.co.ke/, 5 pages, Mar. 2016.

Kim et al., "Ultrathin Cross-Linked Perfluoropolyether Film Coatings from Liquid $CO_2$ and Subsequent UV Curing," Chem. Matter, vol. 22, pp. 2411-2413, 2010.

(56) References Cited

OTHER PUBLICATIONS

U.S. Appl. No. 16/903,110, filed Jun. 16, 2020, pending.
U.S. Appl. No. 17/502,721, filed Oct. 15, 2021, pending.
U.S. Appl. No. 17/843,756, filed Jun. 17, 2022, pending.

* cited by examiner

ELECTRONIC DEVICE HOUSING WITH INTEGRATED ANTENNA

CROSS-REFERENCE TO RELATED APPLICATION(S)

This application is a continuation patent application of U.S. patent application Ser. No. 16/903,110, filed Jun. 16, 2020 and titled "Electronic Device Housing with Integrated Antenna," which is a continuation patent application of U.S. patent application Ser. No. 16/183,591, filed Nov. 7, 2018 and titled "Electronic Device Housing with Integrated Antenna," now U.S. Pat. No. 10,705,570, which is a non-provisional patent application of and claims the benefit of U.S. Provisional Patent Application No. 62/725,227, filed Aug. 30, 2018 and titled "Electronic Device Housing with Integrated Antenna," the disclosures of which are hereby incorporated herein by reference in their entireties.

FIELD

The described embodiments relate generally to electronic device housings, and more particularly to housings that include integrated antennas.

BACKGROUND

Electronic devices often use wireless communications to send and receive information. Tablet computers, mobile telephones, and notebook computers, for example, all use wireless radios to send and receive information. In some cases, a device may use multiple different antennas to facilitate wireless communications in different frequency bands. Antennas may be positioned inside of an electronic device housing and may send and receive wireless signals (e.g., electromagnetic waves) through the device housing.

SUMMARY

An electronic device may include a display, a housing member at least partially surrounding the display and including a first segment defining a first portion of an exterior surface of the electronic device, a second segment defining a second portion of the exterior surface of the electronic device and configured to function as an antenna, and a bridge segment structurally and conductively coupling the first segment to the second segment. The electronic device may also include a molded element positioned between the first segment and the second segment and defining a third portion of the exterior surface of the electronic device.

The first segment, the second segment, and the bridge segment may be formed from a single piece of metal. The first segment, the second segment, and the bridge segment may include a conductive material, and the molded element may be a non-conductive polymer material. The first segment may define a back wall of the electronic device and the second segment may define a side wall of the electronic device. The molded element may at least partially encapsulate the bridge segment.

The electronic device may further include antenna circuitry coupled to the second segment and configured to process signals corresponding to a wireless communication protocol. A length of the second segment may correspond to a wavelength of the wireless communication protocol.

An electronic device may include a display, a cover assembly defining at least a portion of a front surface of the electronic device, a touch sensor configured to detect touch inputs applied to the front surface of the electronic device, and a housing member at least partially enclosing the display and the touch sensor. The housing member may include a first segment defining a first portion of a back surface of the electronic device, and a second segment coupled to the first segment and defining a second portion of the back surface of the electronic device and a recess formed along an interior side of the second segment. the Recess may be configured to tune capacitive coupling between the first segment and the second segment. The electronic device may also include a molded element positioned between the first segment and the second segment and defining a third portion of the back surface of the electronic device, and antenna circuitry coupled to the second segment. The second segment may be set apart from the first segment by a slot, and the molded element may be positioned in the slot.

The second segment may define a ledge extending into an internal volume of the electronic device, the recess may be one of a series of recesses formed in the ledge, the ledge may define at least a portion of a mounting surface, and the cover assembly may be attached to the mounting surface. The series of recesses may extend along an entire length of the second segment.

The molded element may be a first molded element and the electronic device may further include additional molded elements within the recesses of the series of recesses. The additional molded elements may define an additional portion of the mounting surface.

The recess may define an interlock feature, the electronic device may further include an additional molded element positioned within the recess and engaged with the interlock feature, and the engagement between the additional molded element and the interlock feature may constrain movement of the additional molded element in multiple directions.

An electronic device may include a display, a cover over the display and defining at least a portion of a front surface of the electronic device, and a conductive housing member defining at least a portion of a back wall opposite the front surface. The conductive housing member may include a first segment defining a first portion of the back wall of the electronic device and a second portion of the back wall extending along a slot formed in the housing member and having a reduced thickness relative to the first portion the back wall. The conductive housing member may also include a second segment configured to function as an antenna, defining a third portion of the back wall, and a fourth portion of the back wall extending along the slot and having a reduced thickness relative to the third portion of the back wall. The electronic device may further include a molded element positioned in the slot and defining a fifth portion of the back wall.

The slot may be formed in the back wall, the slot may define a length of the second segment, and the length of the second segment may correspond to a wavelength of a wireless communication frequency of the antenna. The second portion of the back wall may define a first beveled edge, the fourth portion of the back wall may define a second beveled edge, and the first and second beveled edges tune a capacitive coupling between the first segment and the second segment.

The conductive housing member may be a single piece of aluminum, and the first segment and the second segment may be connected by a bridge segment defined by the single piece of aluminum. The first segment may further define a first portion of a side wall of the electronic device, the second segment may further define a second portion of the side wall, and the molded element further defines a third portion of the side wall between the first segment and the second segment.

The second segment may defines a ledge extending into an internal volume of the electronic device, the ledge may define a series of recesses configured to tune a capacitive coupling between the second segment and the display, the ledge may define at least a portion of a mounting surface, and the cover is attached to the mounting surface.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

In conventional portable electronic devices, antennas may be positioned inside of a housing. For example, in the case of a mobile phone (e.g., a smartphone) that includes a housing and a transparent cover, an antenna may be positioned in an internal cavity defined by the housing and the cover. The antenna may send and receive wireless signals (e.g., radio-frequency (RF) electromagnetic signals) through the material of the housing and/or the cover. In order to avoid or reduce attenuation of the incoming and outgoing signals, the housing and/or cover may be formed from substantially non-conductive materials, such as plastic.

In some cases, it is desirable to use other housing materials. For example, a metal housing may be stronger, tougher, easier to manufacture, or the like. However, housings that include or are formed from metals (or other conductive materials such as carbon fiber) may have a shielding effect on internal antennas that reduces their efficiency and/or effectiveness. Accordingly, as described herein, where housings include conductive materials such as metals, a portion of the housing itself may be used as an antenna to send and/or receive RF signals. More particularly, a metal or conductive housing may include structures that serve as both structural portions of the housing, such as a side wall, as well as RF radiating and/or receiving components. In order to function as antennas, these structures may need to be separated from other conductive portions of the housing while still being structurally joined to the other conductive portions of the housing.

Figure 2A:
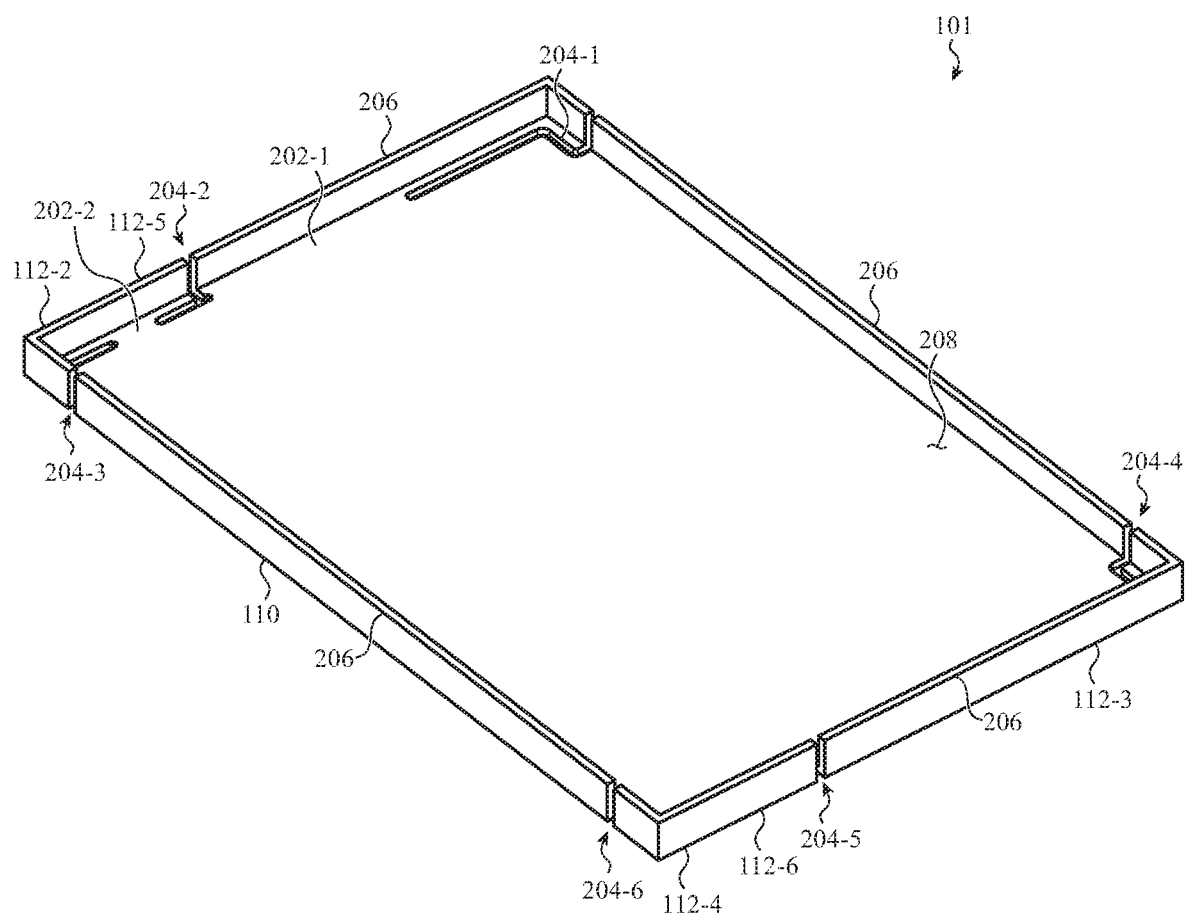
FIG. 2A depicts a front view of an example housing for an electronic device.
Figure 2B:
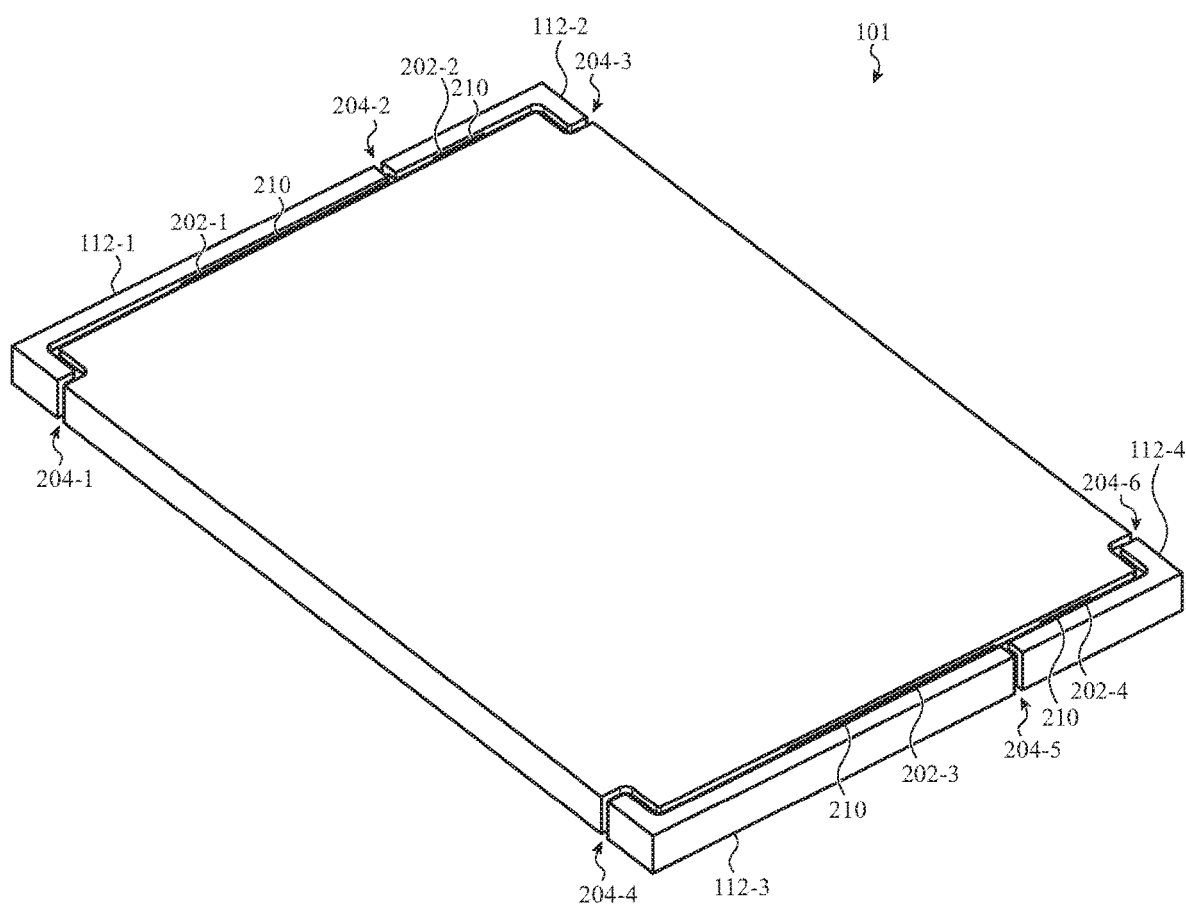
FIG. 2B depicts a back view of the housing of FIG. 2A.

As described herein, antenna structures of a device may be integral with the housing (or a portion of the housing). For example, a single piece of metal may be machined or otherwise formed to include antenna structures from the same piece of metal as a main body of the housing. In some cases, the antenna structures may even define structural portions of the housing, such as a side wall that defines an exterior surface of the housing. For example, the integral antenna structures may be formed by machining a slot (e.g., an elongated channel-like opening) in a housing member. The slot may form a beam-like cantilevered member that extends from a main portion of the housing member. FIGS. 2A-2B illustrate how slots in a housing member may define antenna structures.

A material may be positioned in the gap to seal the gap and to structurally support the antenna structures. The housing and the antenna structures may also include interlock features, such as holes, dovetails, recesses, protrusions, or the like, that are engaged by the filler material to help keep the filler material in place and to improve the overall structural strength of the housing and its antenna structures.

Because an integrated antenna structure may be close to other metal or conductive portions of the housing, the antenna structure may capacitively couple to the nearby housing (or other conductive components of the device, such as a display or a circuit board), thus degrading or otherwise negatively affecting the performance of the antenna. Accordingly, the antenna structures and/or the housings described herein may include features that decrease the capacitive coupling between an antenna structure and an adjacent portion of the housing (as compared to antenna structures and/or housings that do not include such features). Such features may help tune the capacitive coupling (e.g., may cause the antenna features to experience capacitive coupling that is below a threshold level) without requiring drastic increases in separation distance between the antenna and the housing or otherwise weakening the overall structure. For example, an antenna structure and a nearby portion of a housing may have chamfers, rounded edges, recesses, or other features or shapes that effectively remove material from the portions of the antenna and housing that are closest to one another. This may ultimately tune the capacitive coupling between these components, and/or between an antenna structure and any other conductive or potentially interfering component proximate to the antenna structure.

As used herein, features that tune the capacitive coupling between an antenna structure and another component may cause the antenna structures to experience capacitive coupling that is at or below a threshold level, or that is otherwise reduced relative to the same (or similar) antenna structure without the features. The threshold level of capacitive coupling may be a level below which suitable antenna functionality may not be achieved. For example, the threshold level of capacitive coupling may the level at which an antenna cannot reasonably operate in accordance with a target wireless communication protocol. Wireless communication protocols may include established protocols such as IEEE 802.11x, GSM, LTE, CDMA, TDMA, Bluetooth, Bluetooth Low Energy, ISO/IEC 18000-3, or any other target wireless communication protocol or standard (including yet-to-be-developed protocols and/or standards). Further, the threshold level of capacitance may specify an antenna efficiency of the antenna (e.g., an electrical efficiency with which a radio antenna converts the radio-frequency power accepted at its terminals into radiated power) while the antenna is communicating via a wireless communication protocol or standard. For example, in some cases the threshold level of capacitive coupling may be that which allows the antenna to operate according to a wireless communication protocol while achieving a target antenna efficiency.

While the features that provide mechanical interlocks and that reduce deleterious capacitive coupling are described in some cases herein in the context of an integrated housing and antenna structure (e.g., a single piece of material), similar features, structures, and techniques may be used for multi-part housing and antenna structures as well. For example, where an antenna structure is a separate piece of metal than a housing feature (as shown, for example, in FIGS. 10A-10B), the interlocks and capacitance-reducing features described herein may be used to provide similar benefits.

Figure 1A:
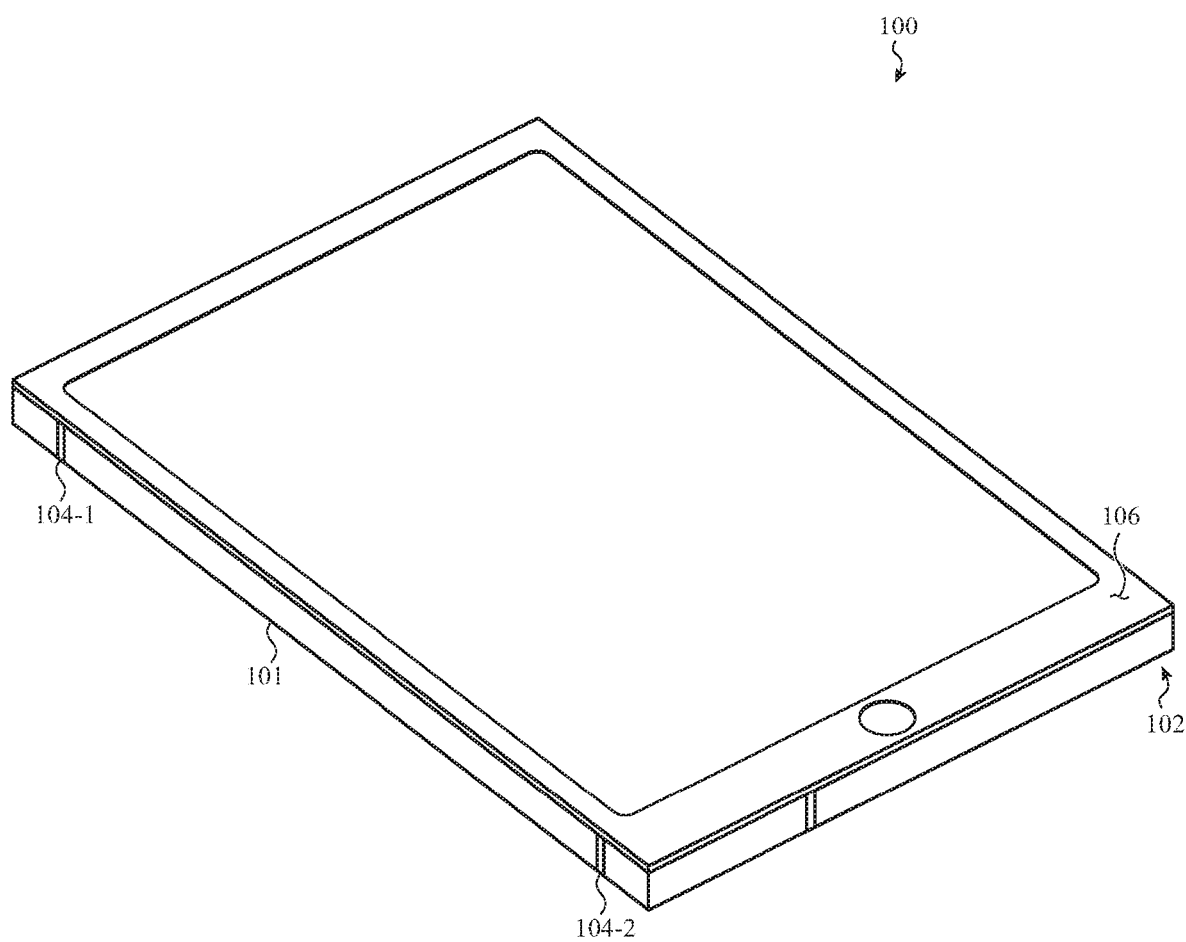
FIG. 1A depicts a front view of an example electronic device.
Figure 1B:
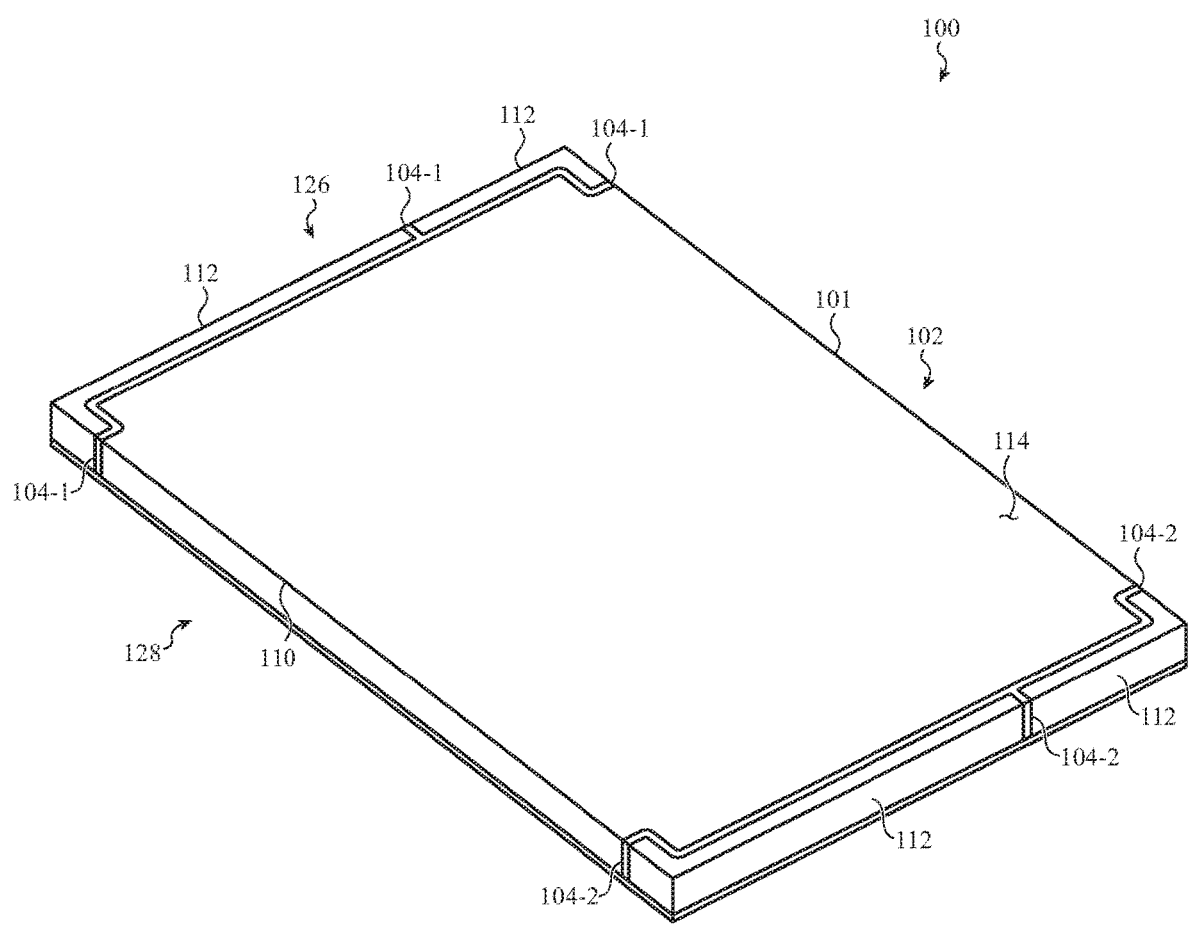
FIG. 1B depicts a back view of the electronic device of FIG. 1A.

FIGS. 1A-1B depict an electronic device. In this example, the electronic device 100 includes a housing member that is formed of a single piece of a conductive material (e.g., metal), and in which antennas are formed directly into the single-piece housing member. The electronic device 100 is depicted as a tablet computer, though this is merely one example embodiment of an electronic device and the concepts discussed herein may apply equally or by analogy to other electronic devices, including mobile phones (e.g., smartphones), watches (e.g., smartwatches), wearable electronic devices, notebook computers, desktop computers, health-monitoring devices, head-mounted displays, digital media players (e.g., mp3 players), or the like.

The electronic device 100 includes an enclosure, which may include a housing 102 and a transparent cover 106 (also referred to simply as a cover) coupled to the housing 102. The cover 106 may define a front face of the electronic device 100. For example, in some cases, the cover 106 defines substantially the entire front face and/or front surface of the electronic device. The cover 106 may also define an input surface of the device 100. For example, as described herein, the device 100 may include touch and/or force sensors that detect inputs applied to the cover 106. The cover 106 may be formed from or include glass, sapphire, a polymer, a dielectric, a laminate, a composite, or any other suitable material(s) or combinations thereof.

The cover 106 may cover at least part of a display 107 that is positioned at least partially within the housing 102 (FIG. 1B). The display 107 may define an output region in which graphical outputs are displayed. Graphical outputs may include graphical user interfaces, user interface elements (e.g., buttons, sliders, etc.), text, lists, photographs, videos, or the like. The display 107 may include a liquid-crystal display (LCD), organic light emitting diode display (OLED), or any other suitable components or display technology.

The display 107 may include or be associated with touch sensors and/or force sensors that extend along the output region of the display and which may use any suitable sensing elements and/or sensing techniques. Using touch sensors, the device 100 may detect touch inputs applied to the cover 106, including detecting locations of touch inputs, motions of touch inputs (e.g., the speed, direction, or other parameters of a gesture applied to the cover 106), or the like. Using force sensors, the device 100 may detect amounts or magnitudes of force associated with touch events applied to the cover 106. The touch and/or force sensors may detect various types of user inputs to control or modify the operation of the device, including taps, swipes, multi-finger inputs, single- or multi-finger touch gestures, presses, and the like. Touch and/or force sensors usable with wearable electronic devices, such as the device 100, are described herein with respect to FIG. 11.

The housing 102 of the device 100 may include molded elements 104 (e.g., 104-1, 104-2) that are positioned in gaps, spaces, slots, or other areas between portions of a housing member 101. The molded elements 104 may define, along with the housing member 101, portions of the exterior surface of the device 100. The housing member 101 may be formed from or include a conductive material, such as metal (e.g., aluminum, steel, stainless steel, titanium, amorphous alloy, magnesium, or other metal or alloy), carbon fiber, or the like. The molded elements 104 may be formed from or include a polymer material, a reinforced polymer material (e.g., fiber reinforced), ceramic, or any other suitable material. The molded elements 104 may be formed of a substantially non-conductive and/or electrically insulating material, or otherwise configured to electrically (e.g., conductively and/or capacitively) isolate or insulate portions of the housing member 101 from each other, as described in greater detail herein. In some cases, the molded elements 104 may be formed by injection molding a material into a gap, space, slot, or other void defined in the housing member 101.

As described herein, the housing member 101 may include segments that form antennas for the electronic device. For example, the housing member 101 may include beams, cantilevered members, or other features that are separated (at least partially) from a main portion of the housing member by gaps, slots, or spaces. The molded elements 104 may be positioned in those gaps, slots, or spaces to fill the gaps and to strengthen the antenna structures and the housing 102 as a whole. FIGS. 2A-2B illustrate an example housing with slots in which the molded elements 104 may be positioned.

FIG. 1B depicts a back view of the device 100. FIG. 1B more clearly illustrates an example configuration of the housing member 101 and the molded elements 104. The housing member 101 may define a first segment 110, which may define a first portion of an exterior surface of the electronic device. For example, the first segment 110 may define at least a portion of a back surface (and a back wall) of the electronic device. In some cases, the first segment 110 defines substantially all of the back surface of the electronic device, such as more than about 80%, more than about 90%, or more than about 95% of the back surface of the electronic device. As more clearly shown in FIGS. 2A-2B, the first segment 110 may also define at least a portion of a side wall of the device 100 (e.g., the lateral side walls of the device), and in some cases can define portions of multiple side walls of the device (e.g., part of a top side wall and part of a left side wall, as shown in FIG. 2A).

Figure 5A:
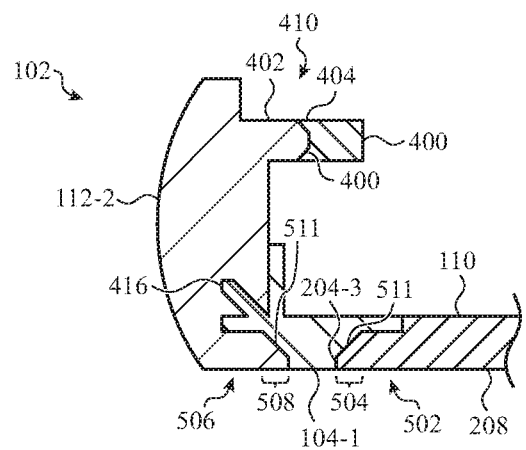
FIGS. 5A-5C depict partial cross-sectional views of example housings for an electronic device.
Figure 5B:
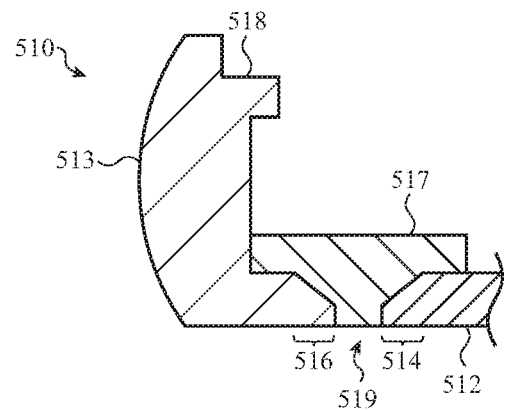
Figure 5C:
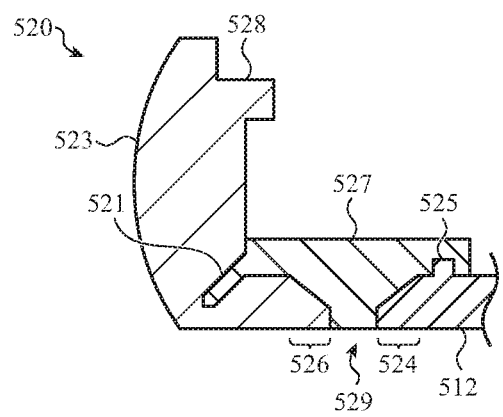

The housing member 101 may also define second segments 112 (e.g., 112-1, ..., 112-n). The second segments 112 may also define part of the exterior surface(s) of the device 100. For example, the second segments 112 may define a portion of the back surface of the device 100, as well as a portion of the side surfaces of the device 100. In some cases, the second segments 112 define at least a portion of a side wall (e.g., the top and bottom side walls) of the device 100, and at least a portion of the back wall of the device 100. FIGS. 5A-5C depict cross-sectional views showing how a second segment may define at least a portion of a back wall and at least a portion of a side wall of a device.

The second segments 112 may also define corners of the device 100. For example, the second segment 112-2 (FIG. 1C) defines a portion of a first side wall 126 of the device 100, and a portion of a second side wall 128 of the device 100. Other second segments 112 of the device may similarly define portions of at least two side walls of the device 100, as shown in the figures.

As described herein, the second segments 112 may be integral with the first segment 110. Stated another way, the housing member 101 may be a single, monolithic component, and the first segment 110 and the second segments 112 may be parts of the single, monolithic component. One or more of the second segments 112 may be configured to function as an antenna for the device 100.

The molded elements 104, which are positioned in the spaces or gaps between the first segment 110 and the second segments 112, may also define part of the exterior surface of the electronic device. For example, the first segment 110, one or more of the second segments 112, and one or more of the molded elements 104 may define a single continuous exterior surface of the device. In some cases, the single continuous surface may be a back surface 114 of the device 100, or a side surface 118. The single continuous surface defined by these three components may be (or may appear to a user to be) substantially smooth and/or seamless. For example, the interface between adjacent components may be sufficiently smooth or tight that a user cannot tactilely perceive or feel any gaps, crevices, grooves, dips, bumps, or other surface irregularities when handling the device.

The shapes, sizes, locations, or other dimensions or properties of the second segments 112 may be selected based on several factors. Where a second segment 112 (or a portion thereof) is configured to be an antenna structure (e.g., a structure that sends and/or receives wireless communication signals), it may have a length that corresponds to a wavelength of a wireless communication protocol. In some cases, the length of the second segment 112 (or the portion configured as an antenna structure) may be equal to the wavelength of the frequency band of the wireless communication protocol (e.g., a full-wave antenna). In other cases, it may correspond to a fraction or harmonic frequency of the frequency band. For example, the length may be one half of the wavelength (e.g., a half-wave antenna), or one quarter of the wavelength (e.g., a quarter-wave antenna), or any other suitable length that facilitates communication over the desired frequency band. The wireless communication protocol may use a frequency band around 2.4 GHz, 5 GHz, 15 GHz, 800 MHz, 1.9 GHz, or any other suitable frequency band. As used herein, a frequency band may include frequencies at the nominal frequency of the frequency band, as well as additional frequencies around the nominal frequency. For example, an antenna structure that is configured to communicate using a 2.4 GHz frequency band may receive and/or radiate signals of in a range from about 2.4000 GHz to about 2.4835 GHz (or in any other suitable range). Other frequency bands may also encompass a range of nearby frequencies, and an antenna configured communicate via those frequency bands may be capable of radiating and receiving frequencies within those ranges as well.

The length of a second segment 112 may correspond to a length of the segment from a base (where the second segment joins the remainder of the housing member 101) to an end of the segment (e.g., a terminal end that is separated from the remainder of the housing member 101). A second segment 112 that is configured to operate as an antenna may be coupled to antenna circuitry that is configured to process signals corresponding to the wireless communication protocol. Example antenna circuitry may include processors, inductors, capacitors, oscillators, signal generators, amplifiers, or the like.

Figure 1C:
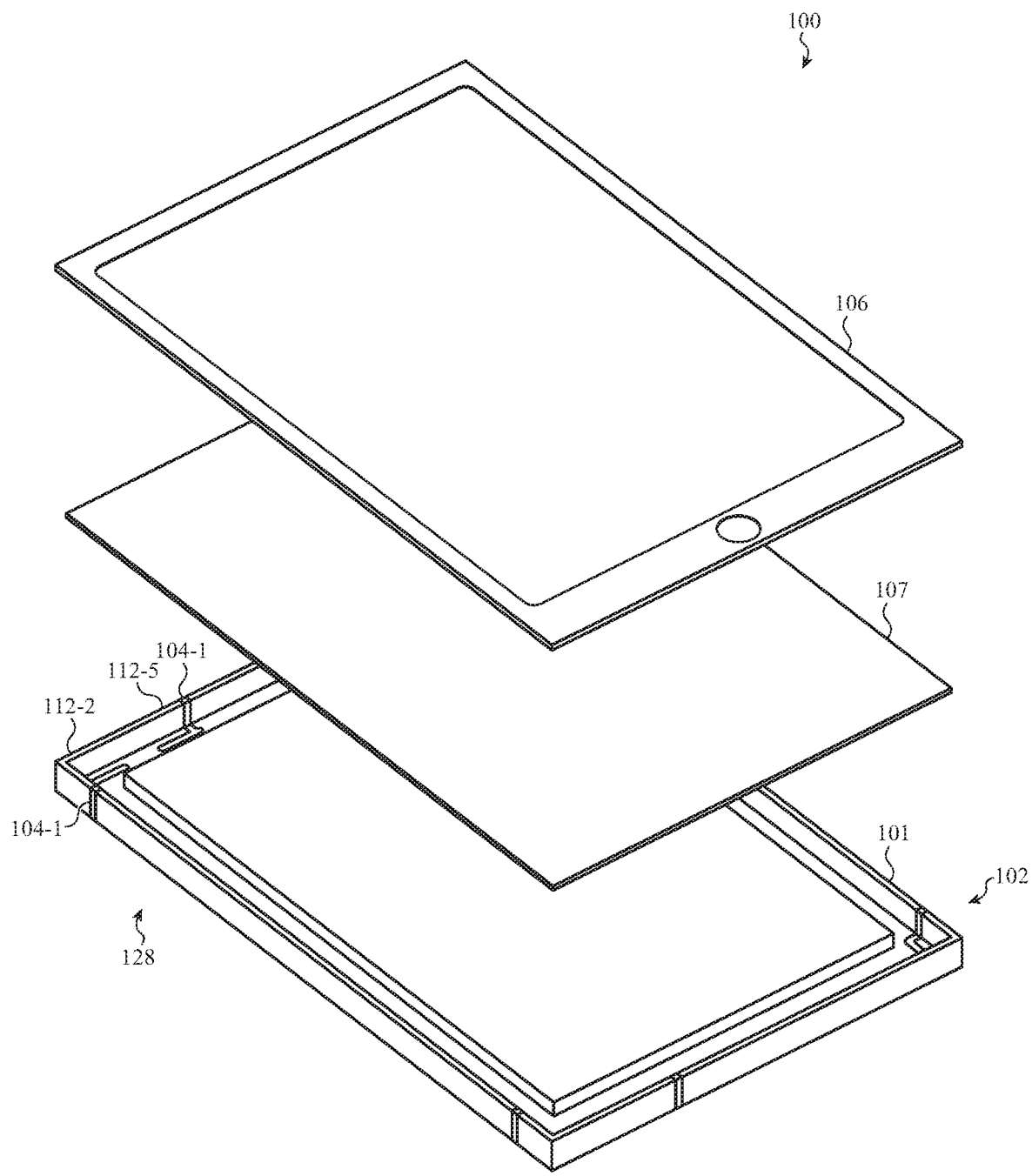
FIG. 1C depicts an exploded view of the electronic device of FIG. 1A.

FIG. 1C depicts an exploded view of the device 100 of FIG. 1A, showing the cover 106 removed from the housing 102. A display 107 may be positioned below the cover 106 and within the housing 102. The display 107 may include various display components, such as liquid crystal display (LCD) components, light source(s) (e.g., light emitting diodes (LEDs), organic LEDs (OLEDs)), filter layers, polarizers, light diffusers, covers (e.g., glass or plastic cover sheets), and the like. The display 107 may be integrated with (or the device 100 may otherwise include) touch and/or force sensors. Using touch sensors, the device 100 may detect touch inputs applied to the cover 106, including detecting locations of touch inputs, motions of touch inputs (e.g., the speed, direction, or other parameters of a gesture applied to the cover 106), or the like. Using force sensors, the device 100 may detect amounts or magnitudes of force associated with touch events applied to the cover 106. The force sensors may be configured to produce an electrical response that corresponds to an amount of force applied to the cover 106. The electrical response may increase continuously as the amount of applied force increases, and as such may provide non-binary force sensing. Accordingly, the force sensor may determine, based on the electrical response of the force sensing components, one or more properties of the applied force associated with a touch input. The touch and/or force sensors may detect various types of user inputs to control or modify the operation of the device, including taps, swipes, multi-finger inputs, single- or multi-finger touch gestures, presses, and the like.

The device 100 may also include internal components 109. The internal components 109, shown as a block for clarity, may include any suitable component of a device, including processors, memory, haptic actuators, electrical circuitry, circuit boards, imaging devices, cameras, batteries, input devices, radios, communications circuitry, light sources, etc. The internal components 109 may be positioned in an internal volume of the electronic device, which may be defined at least partially by the housing 102 (which may form a cavity defined by a back wall and side walls of the housing 102) and the cover 106.

Figure 1D:
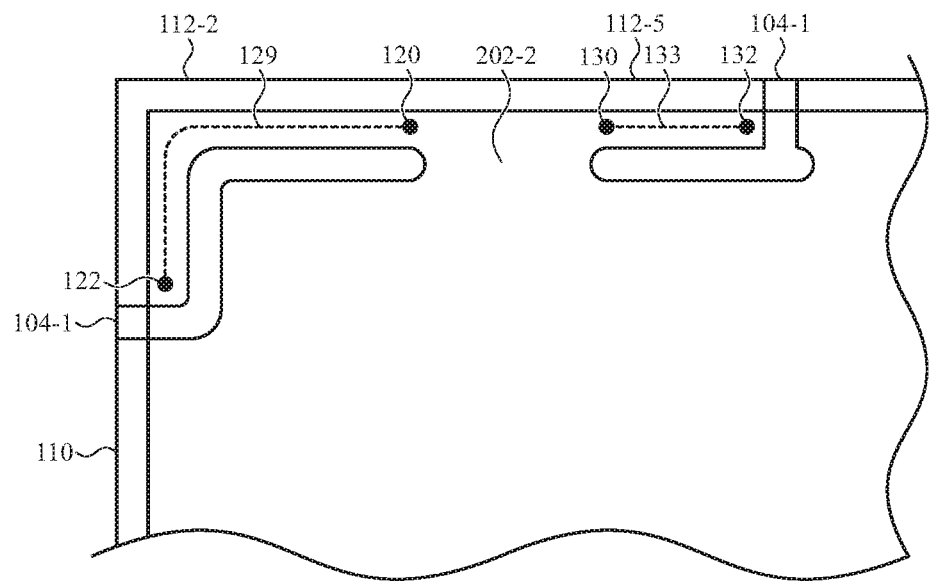
FIGS. 1D-1E depict partial views of the electronic device of FIG. 1A.

FIG. 1D depicts a partial view of the housing 102, corresponding to a first corner of the housing 102 (e.g., the upper-left corner of the housing 102, as oriented in FIG. 1B). FIG. 1D illustrates how a second segment 112 (e.g., the second segment 112-2) may be electrically connected to antenna circuitry to receive and/or send wireless communication signals. For example, antenna circuitry may be connected to the second segment 112-2 at a first connection point 120 and a second connection point 122. In some cases, the first connection point 120 is coupled to an electrical ground, and the second connection point 122 is coupled to an antenna feed (e.g., a source of an electromagnetic signal that transmits wireless signals to the second segment 112-2, and/or a circuit that receives and/or analyzes an electromagnetic signal received by the second segment 112-2). A conductive path 129 may be defined between the connection points 120, 122, corresponding to the conductive path corresponding to an electromagnetic component of a transmitted or received wireless communication signal.

As noted above, the molded element 104-1 may be formed from a dielectric material, such as a polymer, fiber-reinforced polymer, multiple polymers, or the like. The molded element 104-1 may electrically isolate the second segment 112-2 from the first segment 110, at least along a length of the second segment 112-2. Accordingly, the molded element 104-1 helps define the conductive path 129 and isolate the conducive path 129 to the second segment 112-2, thus allowing the second segment 112-2 to function as an antenna.

FIG. 1D also shows another second segment 112-5 that may operate as an antenna. For example, similar to the discussion above with respect to the second segment 112-2, antenna circuitry may be connected to the second segment 112-5 at a first connection point 130 and a second connection point 132. In some cases, the first connection point 130 is coupled to an electrical ground, and the second connection point 132 is coupled to an antenna feed (e.g., a source of an electromagnetic signal that transmits wireless signals to the second segment 112-5, and/or a circuit that receives and/or analyzes an electromagnetic signal received by the second segment 112-5). A conductive path 133 may be defined between the connection points 130, 132, corresponding to the conductive path corresponding to an electromagnetic component of a transmitted or received wireless communication signal.

FIG. 1D shows an example configuration for two of the second segments 112 defined by the housing member 101. Similar configurations may be employed for other second segments 112 of the housing member 101 to allow those second segments 112 to function as antennas. In some cases, the lengths of the second segments 112 (and/or the length of the slots that at least partially define the second segments 112) may be different from one another, or may otherwise be configured to communicate using different frequencies, frequency bands, wireless communication protocols, or the like. For example, the second segment 112-2 shown in FIG. 1D may be configured to operate on a 2.4 GHz and 5 GHz frequency band, while another second segment 112 (e.g., the second segment 112-1, FIG. 1C) may be configured to operate on an 800 MHz frequency band (including a suitable range of nearby frequencies, as described above). In some cases, one second segment 112 may operate on multiple frequency bands, while another second segment 112 may operate on a single frequency band. In this way, different wireless communication functions may be provided by different second segments 112. For example, one second segment 112 may be configured as a WiFi antenna, while a different second segment is configured as a cellular antenna (e.g., to communicate with telecommunications providers via cellular telecommunications networks).

Figure 1E:
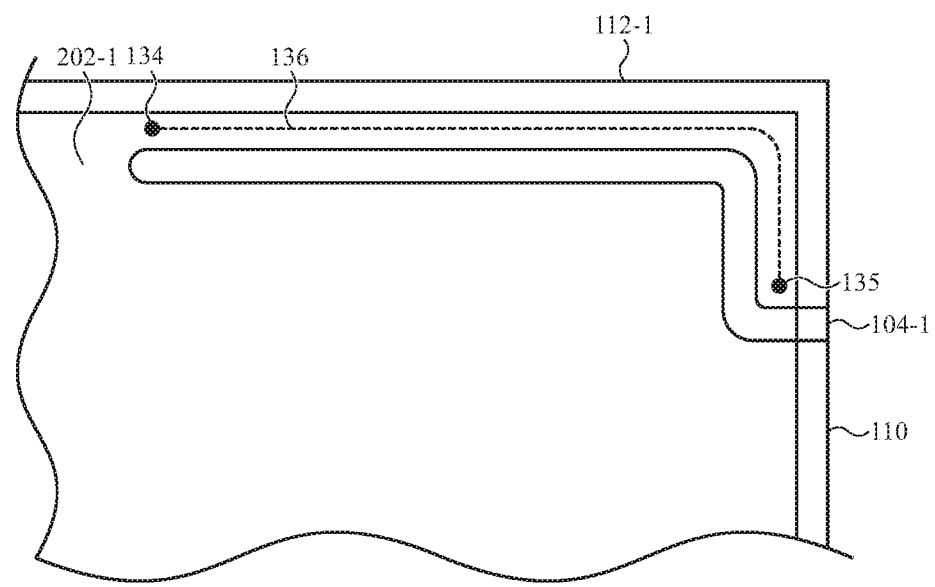

FIG. 1E depicts another partial view of the housing 102, corresponding to a second corner of the housing 102 (e.g., the upper-right corner of the housing 102, as oriented in FIG. 1B). FIG. 1E illustrates how the second segment 112-1 may be electrically connected to antenna circuitry to receive and/or send wireless communication signals. For example, antenna circuitry may be connected to the second segment 112-1 at a first connection point 134 and a second connection point 135. In some cases, the first connection point 134 is coupled to an electrical ground, and the second connection point 135 is coupled to an antenna feed (e.g., a source of an electromagnetic signal that transmits wireless signals to the second segment 112-1, and/or a circuit that receives and/or analyzes an electromagnetic signal received by the second segment 112-1). A conductive path 136 may be defined between the connection points 134, 135, corresponding to the conductive path corresponding to an electromagnetic component of a transmitted or received wireless communication signal.

As noted above, different second segments 112 may be configured to communicate via different frequency bands and/or different wireless communication protocols. For example, each of the second segments 112-1, 112-2, and 112-5, shown in FIGS. 1D-1E, may act as antennas, and may be configured to communicate via different frequency bands and/or wireless communication protocols.

FIG. 2A depicts a front view of the housing member 101, with the internal components of the device 100 as well as the molded elements 104 removed. FIG. 2A shows the monolithic construction of the housing member 101. In particular, the housing member 101 defines the first segment 110 and the second segments 112 (e.g., 112-1-112-4). The housing member 101 also defines bridge segments 202 (e.g., 202-1, . . . , 202-n) that structurally couple the second segments 112 to the first segment 110. While FIG. 2A shows bridge segments 202-1 and 202-2 coupling the second segments 112-1 and 112-2, respectively, to the first segment 110, it will be understood that similar bridge segments may couple the second segments 112-3 and 112-4 to the first segment 110. The bridge segments 202 may be at least partially covered and/or encapsulated by a molded element 104, as shown and described herein.

The bridge segments 202 may also conductively couple the second segments 112 to the first segment 110. For example, where the housing member 101 is a single piece of metal, the bridge segments 202 may both structurally and conductively couple the second segments 112 to the first segment 110 due to the fact that all of the segments are formed of a single metal structure. In other cases, the first segment 110 and the second segments 112 may be separate components, and they may be structurally and conductively coupled to one another via a separate bridge segment. In such cases, the bridge segments may be attached to the first and second segments via welds, fasteners, rivets, stakes, adhesives, interlocks, or any other suitable mechanism or technique.

The housing member 101 may define or include slots 204. The slots 204 may define the second segments 112, and set the second segments 112 apart from the first segment 110 (at least along a length of the slot). For example, the slots 204 may define segments of the housing member 101 that are at least partially separated from the rest of the housing member 101 (e.g., the first segment 110). As shown in FIG. 2A, the slots 204 may be defined through various walls of the housing member 101. For example, the slot 204-3 forms an opening in a side wall 206 of the housing member 101 as well as a back wall 208 of the housing member 101. Further, the slots 204 may define the length of a second segment 112, which may correspond to and/or define the particular wireless communication protocol with which the second segment 112 is configured to communicate. For example, the length of a second segment 112 (which may establish the frequency at which it resonates) may equate to the length of the slot that defines the second segment 112, or it may equate to the length of the second segment that is defined by the slot.

FIG. 2B depicts a back view of the housing member 101. As shown in FIG. 2A, the second segments 112 (e.g., 112-1-112-6) are coupled to the first segment 110 via the bridge segments 202 (e.g., 202-1-202-4). Notably, though the bridge segments 202 connect the first segment 110 to the second segments 112, blind recesses 210 are formed into the housing member 101 along the bridge segments 202. One more blind recesses 210 may connect several slots (which are formed completely through the housing member 101) to form a single, continuous opening along the back and side walls of the device 100. Once a continuous opening is filled by a molded element (e.g., the molded element 104-1, FIG. 1B), the molded element may extend over the bridge segments 202-1, 202-2 in a continuous unbroken line (e.g., filling the blind recesses 210 that extend over the bridge segments 202-1, 202-2). Accordingly, the bridge segments 202 may not be visible from the outside of the device, and each of the molded elements 104 may appear to be continuous, unbroken members.

Figure 3:
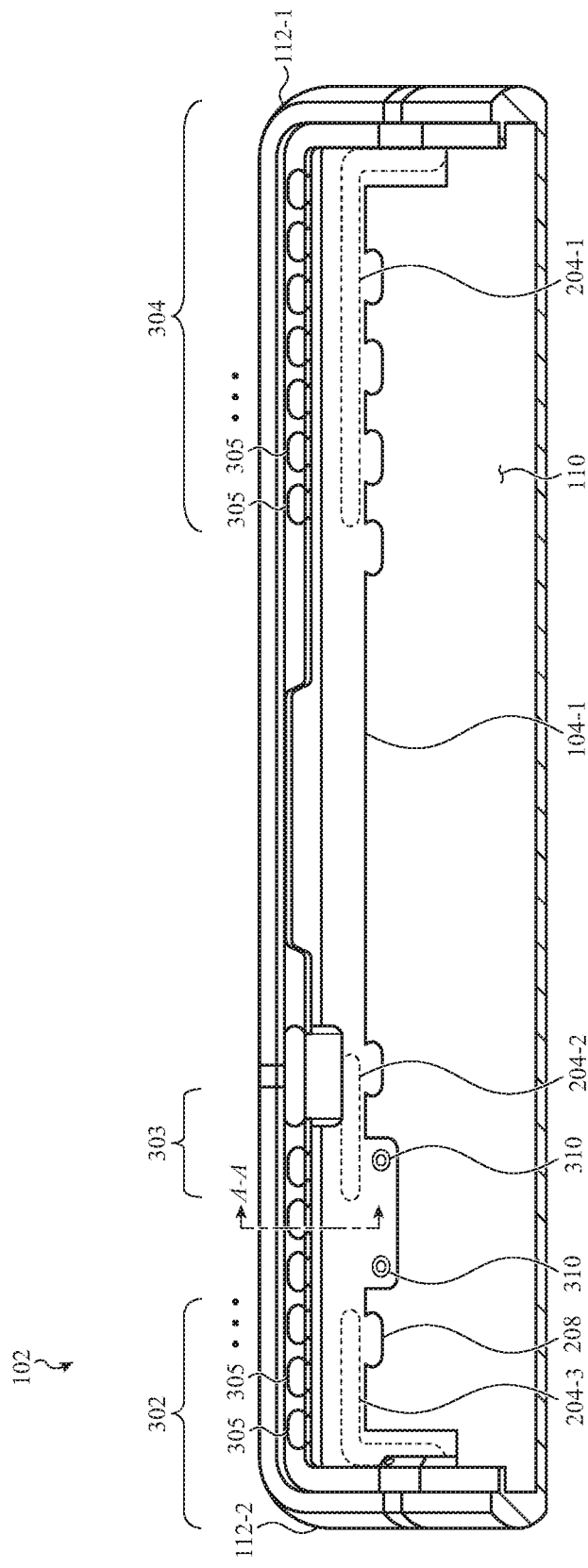
FIG. 3 depicts a portion of a housing for an electronic device.

FIG. 3 depicts a partial view of the housing 102, showing the housing member 101 with a molded element positioned in the slots that define the second segments 112-1 and 112-2. As noted above, the second segments 112 (or portions thereof) of the housing member 101 may be used as antenna structures. FIG. 3 illustrates several features of the housing 102 that facilitate the antenna functionality of the second segments, and that facilitate a secure engagement between the molded element(s) and the housing member 101.

As shown in FIG. 3, the housing member 101 includes the second segments 112-1, 112-2, and 112-5 which are defined by slots formed in the housing member 101. The slots are occupied by the molded element 104-1.

The second segment 112-2 may define a first antenna structure 302, and the second segment 112-5 may define a second antenna structure 303, and the second segment 112-1 may define a third antenna structure 304, with each antenna structure defined by a slot. For example, the first antenna structure 302 is defined at least in part by the slot 204-3, the second antenna structure 303 by the slot 204-2, and the third antenna structure 304 by a portion the slot 204-1.

As noted above, a conductor that acts as an antenna may be negatively affected by nearby conductive materials. For example, capacitive coupling between the first antenna structure 302 and the portion of the housing member 101 that is across the slot 204-3 from the first antenna structure 302 (e.g., the first segment 110) may reduce the effectiveness of the first antenna structure 302. In order to tune the capacitive coupling between the first antenna structure 302 and the housing member 101, the second segment 112-2 may define one or more recesses 305 on an interior side of the second segment 112-2 (e.g., a recess that is configured to be within the internal volume of the device 100 when the device is assembled). The interior side of the second segment 112-2 may be opposite an exterior side of the second segment 112-2, where the exterior side of the second segment 112-2 defines an exterior surface of the device 100. The recesses 305 may be positioned along a ledge of the second segment 112-2, as shown in greater detail in FIG. 4. As shown in FIG. 3, multiple recesses 305 defining a series of recesses 305 may be defined by the second segment 112-2 along the slot 204-2. The series of recesses 305 may extend along substantially an entire length of the slot (and/or the entire length of the portion of the second segment 112-2 that extends along the slot). Other antenna structures (e.g., the antenna structures 303, 304) may include similar recesses 305, as shown in FIG. 3.

The recesses 305 may tune the capacitive coupling between the second segment 112-2 and the first segment 110 of the housing member 101 by increasing the distance between the second segment 112-2 and the first segment 110 (at least in the area where the recess is formed), or between the second segment 112-2 and any conductive component of the device that is proximate to (e.g., directly across from) the recesses 305 and which may capacitively couple to the second segment 112-2. More particularly, capacitive coupling between two conductors may be decreased by increasing the distance between the two conductors. By forming the recesses 305 in the second segment 112-2, as shown in FIG. 3, a greater amount of the second segment 112-2 is positioned further away from the first segment 110 and/or another internal conductive component than would be the case if the recesses 305 were not included. Stated another way, the recesses may increase the average distance between the second segment 112-2 and the first segment 110 (or between the second segment 112-2 and another conductive material or component, such as a display). Accordingly, capacitive coupling between the second segment 112-2 and another component may be lower than if the recesses 305 were not included. More specifically, in some cases the second segment 112-2 may define a surface that faces towards or is otherwise near a surface of another conductive material. The recesses 305 may be formed along or in the surface of the second segment 112-2 to increase the distance between the surfaces, thereby reducing capacitive coupling. The recesses 305 may be empty, or they may be filled by a moldable material, which may be the same moldable material as that which occupies the slots (e.g., the slot 204-2).

Figure 4:
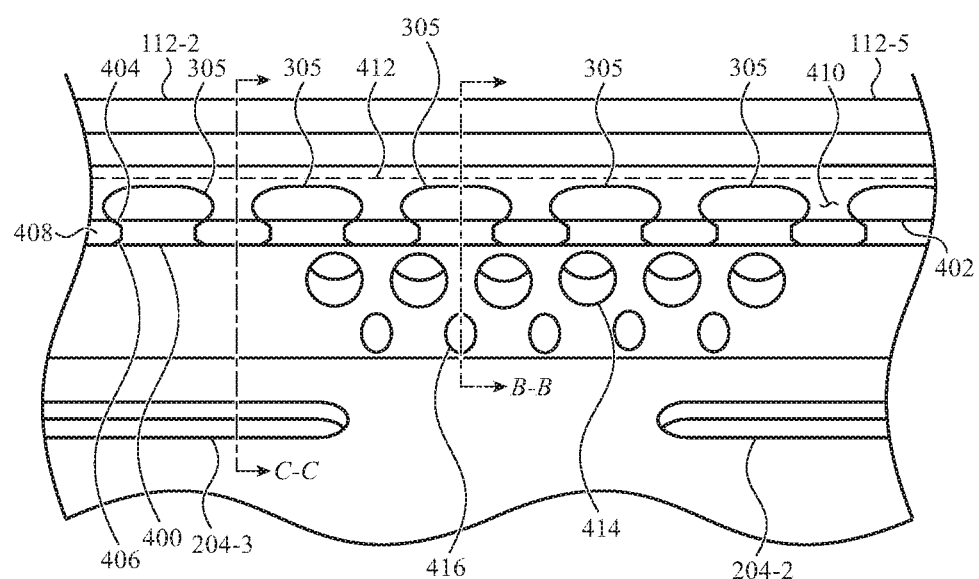
FIG. 4 depicts a partial cross-sectional view of the housing of FIG. 3.

The first segment 110 may also include recesses 308. The recesses 308 may also serve to tune the capacitive coupling between the antenna structures and the first segment 110 (e.g., to reduce the capacitive coupling relative to a segment without the recesses 308). Additionally, the recesses 308 may function as retention features that engage a molded element that is positioned in a slot (e.g., the molded element 104-1). In particular, the recesses 308 may define an undercut that prevents the molded element from separating from the recess 308. More particularly, as shown in FIG. 4, the recesses 308 may be pill- or lozenge-shaped recesses with an opening that is narrower than the width or widest dimension of the recess 308, which may also be referred to as an undercut or undercut feature. Thus, once the molded material is introduced into the recesses 308 (and cured or otherwise hardened), the molded material is captured in the recesses 308 and is thus secured to the first segment 110 (at least along some directions). Of course, other shapes for the recesses 308 are also contemplated, such as dovetails, triangles, or the like.

While features in FIG. 3 are described with reference to the first antenna structure 302 and the slot 204-2, it will be understood that similar features may be applied to other portions of the housing member 101 as well. For example, FIG. 3 also depicts recesses 305 and 308 positioned along the slot 204-1.

FIG. 3 also shows an example of another feature that may provide interlock functionality as well as some additional function. In particular, the housing member 101 (and in particular the first segment 110) includes boss features 310. The boss features 310 may take the form of posts that extend from the first segment 110. The boss features 310 may be cylindrical, square, or any other suitable shape, and may be threaded or otherwise configured to receive a fastener or other component. A molded element (e.g., the molded element 104-1) may surround, partially surround, or otherwise engage with the boss features 310 such that the molded element is secured to the boss features 310. In addition to forming structures for the molded element to structurally engage, the boss features 310 may provide other functions as well. For example, an internal component of a device may be attached to the housing member 101 via the boss features 310. For example, a circuit board, antenna, camera module, battery, sensor, grounding conductor, or the like, may be secured to the housing member 101 using a fastener that engages a boss feature.

FIG. 4 depicts a detail view of the housing member 101. In particular, FIG. 4 shows a portion of the second segment 112-2 that includes recesses 305. As shown, the recesses 305 may be formed in a ledge 402 that extends into an internal volume of the electronic device. The recesses 305 may be at least partially filled or otherwise occupied by another material 400. In some cases, the material 400 filling the recesses 305 may be the same material as the molded element that is positioned in the slot between the first segment 110 and the second segment 112-2. In some cases, the recesses 305 are filled during the same molding process that fills the slots that define the antenna structures of the device. For example, the housing member 101 may be inserted into a mold of a molding machine, and a moldable material may be injected into the mold such that the material flows into one or more slots, into the recesses 305, as well as into and/or around one or more additional features, retention structures, recesses, bosses, dovetails, holes, or the like. This process may be generally referred to as injection molding or insert molding. After the molding process is complete, the housing member 101 with the moldable material may be machined or otherwise processed to form the final shape of the housing 102. The machining process may separate portions of the moldable material into discrete components or pieces. For example, in some cases, after the moldable material is applied to the housing member 101, the material in the recesses 305 is contiguous with the moldable element 104-1 (which may be formed from a moldable material such as a polymer) that is positioned in the slot 204-2 (FIG. 2A). After machining, the material in the recesses 305 may be separated from the material in the slots.

As shown in FIG. 4, the recesses 305 may be configured to retain the material 400 in the recesses 305. For example, the recesses 305 may include chamfer features 404, 406, and the material 400 may engage the chamfer features 404, 406 to constrain the material 400 in the recesses 305, thereby preventing it from coming out of or separating from the recesses 305. More particularly, the engagement between the material 400 and the chamfer feature 406 may prevent the material 400 from coming out of or separating from the recess 305 in an upward direction (relative to the orientation shown in FIG. 4), while the chamfer feature 404 may prevent the material 400 from coming out of the recess 305 in a downward direction. Further, the recesses 305 may have a narrowed region along a front face 408 of the ledge 402 that prevents the material 400 from coming out of the recess 305 in a direction that is parallel to the ledge 402 (e.g., parallel with a mounting surface 410 defined by the ledge 402).

As described above, the recesses 305 may be configured to tune the capacitive coupling between an antenna structure (e.g., the first antenna structure 302 defined by the second segment 112-2) and another portion of the device (e.g., the first segment 110, a display, an internal frame, or the like). FIG. 4 illustrates how the current corresponding to a received or transmitted electromagnetic signal may be confined to a path 412 that is further towards the exterior surface of the second segment 112-2 (thus placing the path 412 further away from other metal components, such as the first segment 110, that may capacitively couple to the second segment 112-2 and interfere with antenna performance). If the recesses 305 were not included, and the ledge 402 was instead a solid, continuous metal segment, the path 412 may be oriented closer to the face 408 of the ledge 402 than shown in FIG. 4, which may serve to increase the deleterious effects of other metal or conductive components of the housing (e.g., by decreasing the distance between the current path and the other conductive components).

FIG. 4 also shows additional features that may be formed in or otherwise defined by the housing member 101. For example, the housing member 101 may include throughholes 414 and retention holes 416. The through-holes 414 and the retention holes 416 are shown as being located in the second segment 112-2, though the same or similar features may be located at any other suitable location of the housing member 101.

The through-holes 414 may be configured to provide access through the housing member 101 for devices that require or benefit from exposure to the outside environment. For example, the through-holes 414 may be positioned proximate to a speaker or other audio output device to allow sound to be directed outside of the housing 102. The through-holes 414 may also provide environmental access (e.g., access to the external environment surrounding the device) to other components, such as microphones, pressure sensors, temperature sensors, or components thereof.

The retention holes 416 may be configured to receive moldable material to provide strength and rigidity to the overall housing structure. For example, as described in greater detail with respect to FIG. 5A, the retention holes 416 may be angled or otherwise configured to prevent the second segment 112-2 from being separated, broken, or bent away from the first segment 110 when a separating force is applied between the first segment 110 and the second segment 112-2. FIG. 4 omits the molded element 104-1 for clarity, though it will be understood that the molded element 104-1 may completely or partially occupy the retention holes 416.

FIGS. 5A-5C depict partial cross-sectional views of electronic device housings, showing additional details of housing members and molded elements that may be implemented in various housing configurations. For example, FIG. 5A, which is a partial cross-section of the housing 102, viewed along line B-B in FIG. 4, shows an example configuration of the retention holes 416. As shown, the retention hole 416 communicates with a slot (e.g., the slot 204-3) in which the molded element 104-1 is positioned. The retention hole 416 is angled relative to a horizontal axis (relative to the orientation shown in FIG. 5A). This angle may help increase the strength of the second segment 112-2 relative to the first segment 110. For example, the engagement between the molded element 104-1 and the angled retention hole 416 may help prevent the second segment 112-2 from being pulled away from the first segment 110. By contrast, a retention hole that is not angled (e.g., a horizontal hole) may not provide as much resistance to a separating force. In some cases, the retention holes 416 may also tune the capacitive coupling between a second segment 112-2 and the first segment 110 by increasing the average distance between the second segment 112-2 and the first segment 110, in a manner similar to the recesses 305 described above.

FIG. 5A also illustrates another feature of the housing member 101 that helps tune the capacitive coupling between different portions of the housing member 101 (e.g., between the second segment 112-2, which may operate as an antenna, and the first segment 110). In particular, the slot 204-3 may be between the first segment 110 and the second segment 112-2, and may define the length, width, and/or other dimension or configuration of the second segment 112-2 itself. The slot 204-3, and in particular the walls defining the slot, may have a reduced thickness proximate the opening of the slot 204-3, which may reduce capacitive coupling between the first segment 110 and the second segment 112-2 (relative to walls without a reduced thickness region).

For example, as shown in FIG. 5A, the first segment 110 may define a first portion 502 of a back wall 208 of a housing 102, where the first portion 502 has a first thickness. The first segment 110 may also define a second portion 504 of the back wall 208, where the second portion 504 extends along the slot 204-3 and has a reduced thickness relative to the first portion 502 of the back wall 208. Similarly, the second segment 112-2 may define a third portion 506 of the back wall, where the third portion 506 has a third thickness, and may also define a fourth portion 508 of the back wall, where the fourth portion 508 has a reduced thickness relative to the third portion 506. As shown, the portions 504, 508 (also referred to as reduced thickness portions 504, 508) are defined by beveled edges 511 formed into the housing member 101 along the first segment 110 and the second segment 112-2. In other implementations, the reduced thickness portions may be defined by other shapes (e.g., a rabbet, a cove, or the like).

By reducing the thickness of the first segment 110 and the second segment 112-2 where the first and second segments 110, 112-2 are close together (e.g., along the slot 204-3), the amount or degree of capacitive coupling between the first segment 110 and the second segment 112-2 may be reduced, as compared to a configuration where the segments do not have a reduced thickness. As described above, this configuration may provide better antenna performance in cases where the second segment 112-2 operates as an antenna. More particularly, by reducing the facing area of the conductive materials that face one another across the slot 204-3, capacitive coupling between the two conductive materials (here the first segment 110 and the second segment 112-2) may be reduced. In some cases, the reduced thickness portions 504, 508 extend the full length of the slot 204-3 (including any linear sections, curved sections, or the like). In some cases, each slot in a housing member that defines an antenna portion may include reduced thickness portions along the length of the slot (e.g., the full length of the slot).

FIG. 5A also depicts how the ledge 402 and the molded material 400 cooperate to define the mounting surface 410. The mounting surface 410 may receive and/or support another component or assembly of a device. For example, a cover assembly (which may include the cover 106 and optionally one or more components of a display, touch sensor, force sensor, or the like) may be positioned on the mounting surface 410. In some cases, the cover assembly (or any other suitable component) may be adhered to the mounting surface 410. In such cases, an adhesive (e.g., a heat-sensitive adhesive, pressure-sensitive adhesive, liquid adhesive, etc.) may be placed on the mounting surface 410 and/or the cover assembly, and the cover assembly may be placed on and bonded to the mounting surface 410. A cover assembly may instead or additionally be secured to the housing 102 via fasteners, clips, latches, mechanical interlocking structures, or any other suitable features or materials.

FIG. 5B is a partial cross-sectional view of another housing 510. FIG. 5B may represent a cross-section of the housing 102 at a different location than that shown in FIG. 5A (e.g., line C-C in FIG. 4), or it may represent a cross-section of a different housing. The housing 510 includes a first segment 512 (which may be an embodiment of or otherwise similar to the first segment 110) and a second segment 513 (which may be an embodiment of or otherwise similar to the second segment 112-2). The first and second segments 512, 513 may define a slot 519 that separates the first segment 512 and the second segment 513 at least along the length of the slot 519. The housing 510 may also include a ledge 518 on which a component (e.g., a cover assembly) may be supported and/or adhered. As shown, the ledge 518 may be defined (at least at the location corresponding to the cross-section in FIG. 5B) by only the material of the second segment 513. Accordingly, there may be no recesses that are filled with molded material. The outermost face of the ledge 518 may be extend towards the interior volume of the device less than the outermost face of the ledge 402 (FIG. 4). In this way, capacitive coupling between the ledge 518 and other components within an electronic device may be tuned to achieve a target antenna performance, efficiency, resonant frequency, or the like.

The first and second segments 512, 513 may also define wall portions having reduced thickness 514, 516, respectively. The reduced thickness portions 514, 516 may provide similar functionality to the reduced thickness portions 504, 508 discussed with respect to FIG. 5A. The housing 510 also includes a molded element 517 positioned in the slot 519. The molded element may correspond to any of the molded elements described herein, and as such details of the molded element will not be repeated here. The molded element 517 may have a different configuration (e.g., size, thickness) than the molded element shown in FIG. 5A. Further, the first and second segments 512, 513 do not include retention features such as the blind holes 416 (at least at the location corresponding to the cross-section in FIG. 5B), and the molded element 517 therefore does not have corresponding features engaged with the retention features. Of course, retention features such as undercuts, threaded holes, blind holes (e.g., the blind holes 416), or the like may be located at other locations of the housing 510.

FIG. 5C is a partial cross-sectional view of another housing 520. FIG. 5C may represent a cross-section of the housing 102 at a different location than that shown in FIG. 5A (e.g., line C-C in FIG. 4), or it may represent a cross-section of a different housing. The housing 520 includes a first segment 522 (which may be an embodiment of or otherwise similar to the first segment 110) and a second segment 523 (which may be an embodiment of or otherwise similar to the second segment 112-2). The first and second segments 522, 523 may define a slot 529 that separates the first segment 522 and the second segment 523 at least along the length of the slot 529. The housing 520 may also include a ledge 528 on which a component (e.g., a cover assembly) may be supported and/or adhered. As shown, the ledge 528 may be defined (at least at the location corresponding to the cross-section in FIG. 5C) by only the material of the second segment 523. Accordingly, there may be no recesses that are filled with molded material. The outermost face of the ledge 528 may be extend towards the interior volume of the device less than the outermost face of the ledge 402 (FIG. 4). In this way, capacitive coupling between the ledge 528 and other components within an electronic device may be tuned to achieve a target antenna performance.

The first and second segments 522, 523 may also define wall portions having reduced thickness 524, 526, respectively. The reduced thickness portions 524, 526 may provide similar functionality to the reduced thickness portions 504, 508 discussed with respect to FIG. 5A. The housing 520 also includes a molded element 527 positioned in the slot 529. The molded element may correspond to any of the molded elements described herein, and as such details of the molded element will not be repeated here.

The housing 520 shows alternative retention features that may be included in a housing member to increase the strength, rigidity, toughness, or other structural property of the housing 520, and/or to increase the strength of the attachment of the molded element 527 to the housing member that defines the first and second segments 522, 523. For example, the second segment 523 may define a blind hole 521. The blind hole 521 may be angled relative to a horizontal axis (relative to the orientation of FIG. 5C). Accordingly, the blind hole 521 may function similar to the blind holes 416 described above. In contrast to the blind holes 416, however, the blind hole 521 may extend at a different angle than the blind holes 416. For example, it may extend at a downward angle relative to the horizontal axis.

The first segment 522 also includes a retention feature 525. The retention feature 525 may be formed into the first segment 522 via any suitable process, such as machining, forging, etching, attaching a separate member to the first segment 522, or the like. The retention feature 525 may extend from a surrounding surface or portion of the first segment 522, and the molded element 527 may at least partially surround, encapsulate, or otherwise engage the retention feature 525. The engagement between the molded element 527 and the retention feature 525 may increase the strength, rigidity, toughness, or other structural property of the housing 520, and/or to increase the strength of the attachment of the molded element 527 to the first and segment 522. The retention feature 525 may be a post, such as a cylindrical post, square post, or any other shaped post. In some cases, the retention feature 525 may have threads, grooves, splines, or other features that facilitate secure engagement between the retention feature 525 and the molded element 527. Other types of retention features may be used on the first segment 522 in addition to or instead of the retention feature 525, such as dovetails, holes, recesses, channels, undercuts, or the like.

Figure 6:
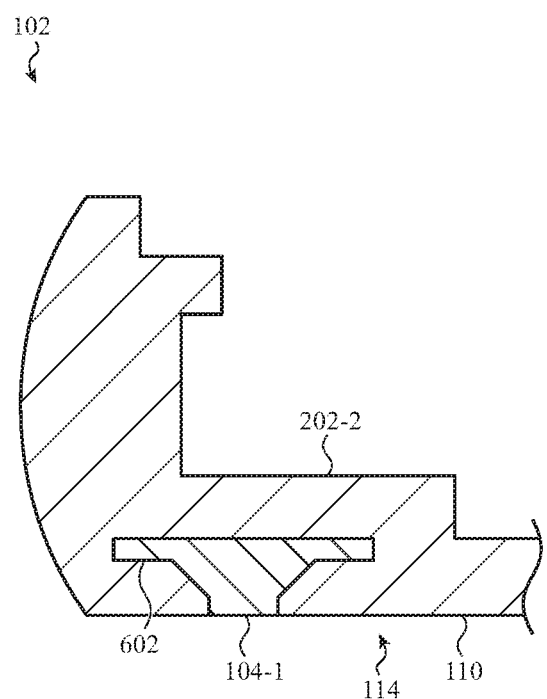
FIG. 6 depicts a partial cross-sectional view of an example housing for an electronic device.

FIG. 6 is a partial cross-sectional view of the housing 102, viewed along line A-A in FIG. 3, which extends through the bridge segment 202-2. FIG. 6 illustrates how the first segment 110 and the second segments may be connected together by a bridge segment (e.g., the bridge segment 202-2 that joins the second segment 112-2 to the first segment 110). As noted above, the housing member 101 may be a single piece of metal. Accordingly, the bridge segment 202-2, the second segments 112-2, 112-5 (FIG. 3), and the first segment 110 may be a single, unbroken piece of metal (or any other suitable material). In some cases, the slot or slots that separate the first segment 110 of the housing from one or more second segments continues through the bridge segment 202-2. For example, though a molded element may appear unbroken along a back wall of the housing, the slots in which the molded element is positioned do not completely sever the first segment 110 from the second segments. Rather, a blind recess 602 may be formed in the bridge segment 202-2 (as well as other bridge segments shown and described herein), such that the molded element 104-1 is a single, continuous member. The blind recess 602 may communicate with and essentially join the slot 204-1 and the slot 204-2. By forming the blind recess 602 through the bridge segment 202-2, the molded element 104-1 may be stronger and less likely to decouple from the housing member 101 due to the added structural integrity resulting from the unitary structure (as opposed to having smaller, discontinuous molded elements separating the first segment 110 from the second segments 112-2, 112-5, and the like). Moreover, the molded element 104-1 may at least partially encapsulate the bridge segment 202-2. For example, the molded element 104-1 may be molded in the blind recess 602 and around at least some of the sides of the bridge segment 202-2, and optionally over the interior-facing side of the bridge segment 202-2. This may further strengthen the coupling between the molded element 104-1 and the bridge segment 202-2.

The blind recess 602 may have a similar shape as an adjoining slot (e.g., the slot 204-2 and/or the slot 204-3). For example, the opening of the blind recess 602 along the back surface 114 of the housing may be the same width as an adjacent portion of a slot 204 (which may have a constant or variable width along the length of the slot). This may produce a molded element with a uniform width dimension, as shown in FIGS. 1A-1C. Further, the blind recess 602 may be defined by wall portions that have reduced thicknesses, such as the beveled edges described with respect to FIGS. 5A-5C. In some cases, the blind recess 602 in the bridge segment 202-2 may be formed by the same tool(s) and/or machining operation(s) that are used to form the slots 204. For example, a slot may be formed by machining a substantially rectangular groove into the wall portions of a housing member 101, and then machining the beveled edges into the wall portions to define the reduced thickness portions. In some cases, a tool for forming the beveled edges may be larger than the opening of the initial rectangular channel in one dimension, and smaller than the opening in another dimension. For example, the tool may be have a rectangular shape that can only be inserted into the channel when it is in one orientation (e.g., its long axis is parallel to the length of the channel). In such cases, the tool may be aligned so it's long axis is parallel to the channel, inserted into the channel, and then rotated to machine away material in the channel and form the reduced thickness portions (e.g., the beveled edges).

Figure 7A:
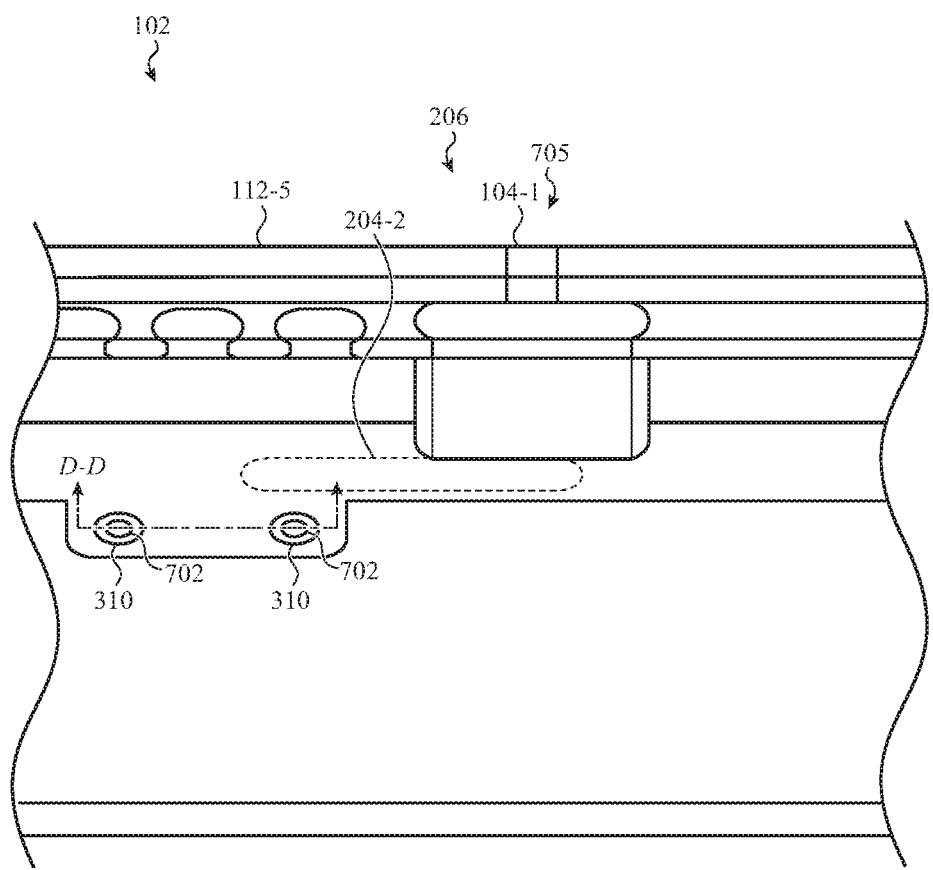
FIG. 7A depicts a portion of a housing for an electronic device.

FIG. 7A is a partial view of the housing 102, showing the boss features 310 of the housing member 101, and how the molded element 104-1 engages the boss features 310. As shown, the boss features 310 each include an opening 702 within a post or other feature that extends above a surface of the first segment 110. The openings 702 may be threaded, or otherwise configured to receive a fastener.

In some cases, the boss features 310 extend from an interior surface of the back wall of the device. The molded element 104-1 may at least partially surround the boss features 310, and in some cases completely surround at least an outer circumference or perimeter of the boss features 310 (as shown), thereby securing the molded element 104-1 to the first segment 110 of the housing member 101. More particularly, by at least partially surrounding the boss features 310, the molded element 104-1 helps prevent the molded element 104-1 from decoupling from the first segment 110 at least in the direction that is parallel to the back wall 208 (FIG. 2A) of the housing 102.

Figure 7B:
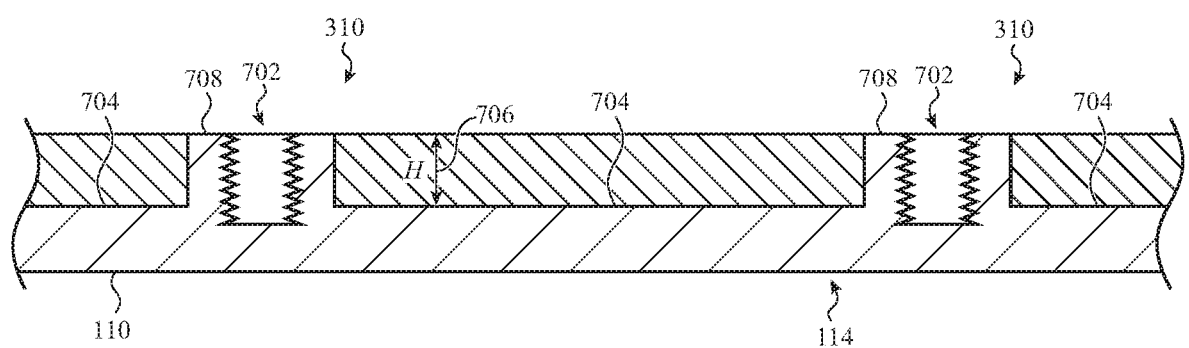
FIG. 7B depicts a partial cross-sectional view of the housing of FIG. 7A.

FIG. 7B is a partial cross-sectional view of the housing 102, viewed along line D-D in FIG. 7A. As shown, the boss features 310 extend above an inner surface 704 of the first segment 110 by a height 706. Because the boss features 310 extend above the inner surface 704, the molded element 104-1 is able to at least partially surround or otherwise engage the boss features 310 to provide the structural coupling described above. Further, as noted above, by extending above the inner surface 704, the boss features 310 may help tune the capacitive coupling between a component that is fastened to the housing 102 via the boss features 310, and the back wall of the housing 102. For example, if the top surfaces 708 of the boss features 310 were flush with the inner surface 704 of the first segment 110, a component that is fastened to the housing via the boss features 310 may be essentially flush with or touching the first segment 110. This may produce deleterious capacitive coupling between the component and the first segment 110. Because the boss features 310 are raised above the inner surface 704, the distance between the component coupled via the boss features 310 and the first segment 110 may be increased, which may tune the capacitive coupling between those components.

FIG. 7A also shows the area in which the slot 204-2 extends through the side wall 206 of the housing member 101. As described above, the molded element 104-1 may occupy some or all of an opening 705 in the side wall 206, and the molded element 104-1 itself may define part of the side surface of the housing 102 (e.g., forming a continuous side surface along with the side walls defined by the second segment(s) and/or the bridge segment(s). The opening 705 may be a portion of or a feature of a slot in the housing member 101 that defines the second segment 112-5 (e.g., the slot 204-2).

The second segments 112-5 and/or the side walls (which may be defined by a second segment and/or a bridge segment) may also define interlock features proximate the opening 705. The molded element 104-1 may engage the interlock features to help strengthen the housing 102 in the area of the slot 204-2, which may be susceptible to being pried apart or compressed together due to use and/or misuse of the device. The interlock features may include openings, recesses, posts, undercuts, holes, threaded or grooved features, or any other suitable feature with which the molded element 104-1 may engage to help retain the molded element 104-1 to the housing member 101.

Figure 7C:
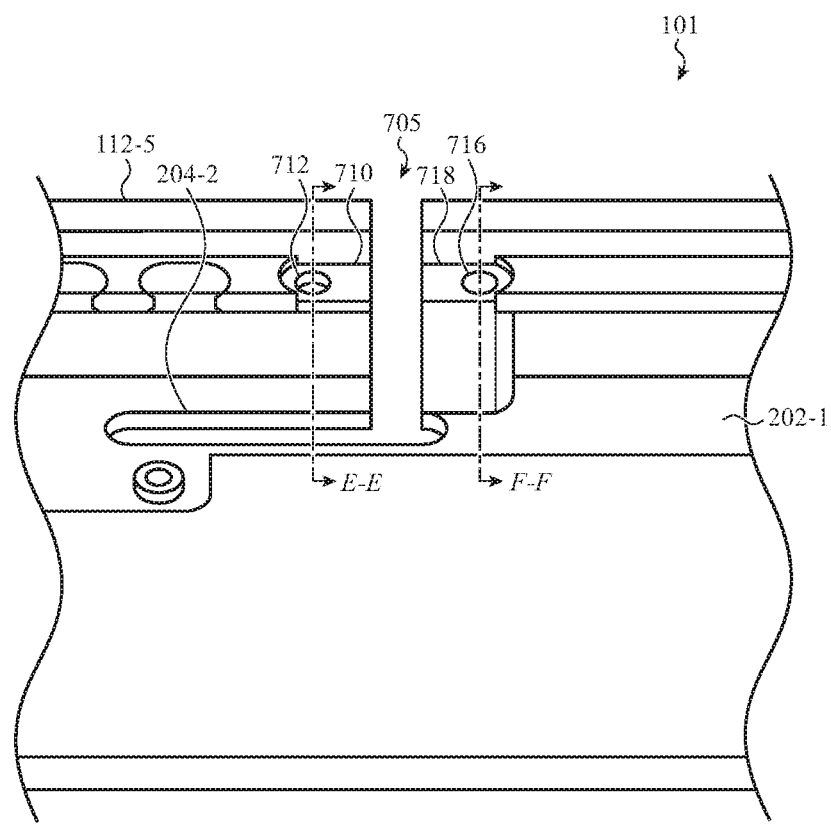
FIG. 7C depicts a portion of a housing member for an electronic device.

FIG. 7C depicts a portion of the housing member 101 that includes the opening 705, showing the housing without the molded element 104-1 and revealing example interlock features. As shown, the second segment 112-5, which may be at least partially separated from the first segment 110 by the slot 204-2, includes a shelf feature 710 that defines an opening 712. Similarly, a corresponding interlock may define an opening 716. As illustrated in greater detail in FIGS. 7D-7E, the molded element 104-1 may fill the openings 712, 716 and surround the shelf feature 710. As described herein, the interlocking engagement between the molded element 104-1 and the openings 712, 716 secures the molded element 104-1 to the housing member 101 and increases the strength of the housing 102.

Figure 7D:
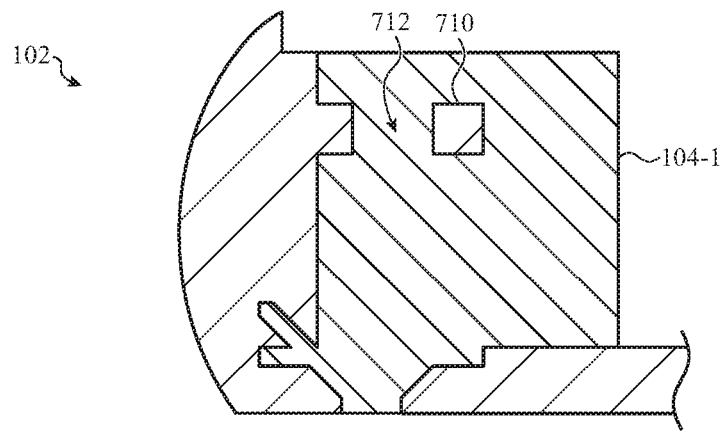
FIGS. 7D-7E depict partial cross-sectional views of the housing of FIG. 7C.

FIG. 7D depicts a partial cross-sectional view of the housing 102, viewed along line E- E in FIG. 7A. FIG. 7D shows the shelf feature 710 and the opening 712 in the shelf feature 710, and how the molded element 104-1 engages the shelf feature 710 and opening 712.

Figure 7E:
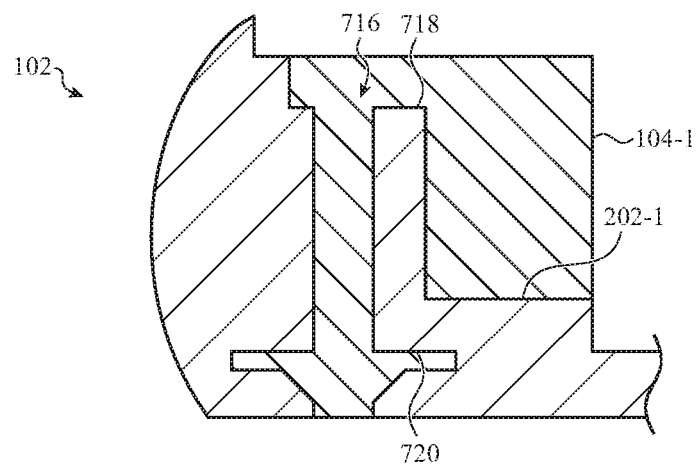

FIG. 7E depicts a partial cross-sectional view of the housing 102, viewed along line F-F in FIG. 7A. FIG. 7E shows the opening 716, and how the molded element 104-1 engages the shelf feature opening 716. As described above, the bridge segment 202-1 may include a blind recess 602 (FIG. 6) that connects the slot 204-1 to the slot 204-2 (FIG. 2A) and allows the molded element 104-1 to form a continuous, unbroken member along the back wall 208 of the housing 102 (FIG. 2A). As shown in FIG. 7E, the opening 716 may extend from a top surface 718 of the interlock feature to a surface 720 that defines part of the blind recess 602.

Figure 8:
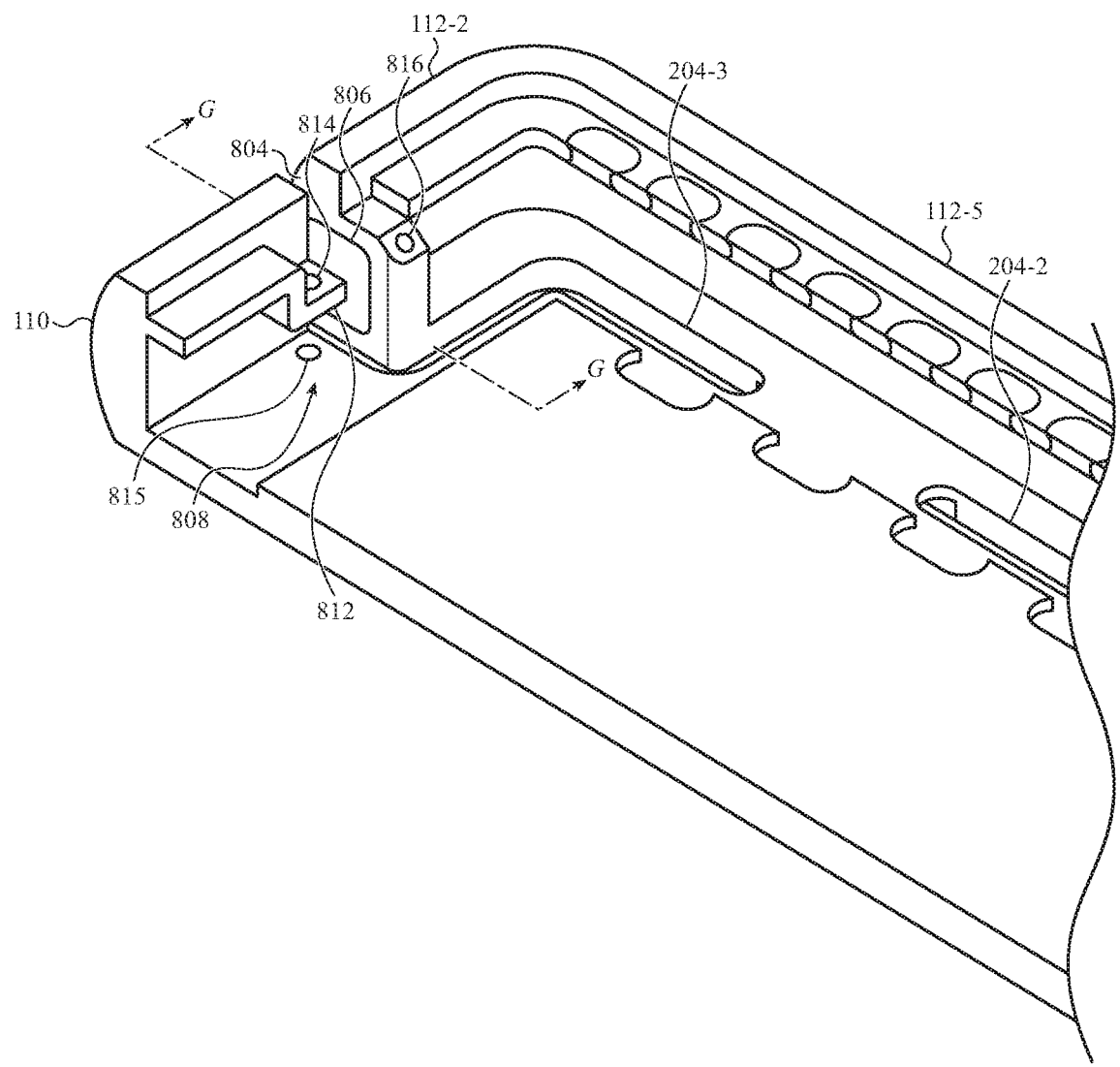
FIG. 8 depicts a portion of a housing member for an electronic device.

As noted above, capacitive coupling between a segment of a housing member 101 that is used as an antenna and other segments of the housing may negatively impact the effectiveness, efficiency, or other operational property of the antenna. Accordingly, various features are used to tune the capacitive coupling between such segments of a housing member 101. FIG. 8 illustrates another feature of the housing member 101 that decreases the capacitive coupling between an antenna structure and another segment of the housing member 101. In particular, FIG. 8 shows the first segment 110 and the second segment 112-2 where the slot 204-3 is formed in the housing member 101.

The slot 204-3 may extend through both the back wall 208 of the housing member 101, as well as through a side wall 206 of the housing member. The slot 204-3 may define an opening 802 in the side wall 206 of the housing member 101. Where the second segment 112-2 acts as an antenna, the proximity of the first segment 110 to an end face 804 of the second segment 112-2 may cause capacitive coupling between the end face 804 and the first segment 110. In order to help tune the capacitive coupling between the first segment 110 and the end face 804 of the second segment 112-2, a recess 806 may be formed in the end face 804. The recess 806 may be a blind recess, and may be any suitable depth. For example, the recess 806 may have a depth (measured from the end face 804, for example) of about 0.5 mm, about 0.75 mm, about 1.0 mm, about 1.25 mm, about 1.5 mm, about 2.0 mm, or any other suitable depth. In some cases, the recess may have a depth of about 5.0 mm or greater. In some cases, the recessed area of the end face 804 may be characterized by a percentage of the overall area of the end face 804 (e.g., the surface area of the end face 804 if the end face 804 had no recess). In some case, the recessed area is equal to or greater than about 50%, about 60%, about 70%, about 80%, about 90% or about 95% of the overall area of the end face 804. By recessing a significant portion of the end face 804, the amount of the end face 804 that is in close proximity to the first segment 110 may be reduced thus reducing capacitive coupling between the second segment 112-2 and the first segment 110.

FIG. 8 also shows an example interlock feature 808 formed in the portion of the first segment 110 that defines a side of the opening 802. The interlock feature 808 may include a shelf feature 812 that defines an opening 814, as well as an opening 815 in the housing member 101. The molded element 104-1 may engage the shelf features 812 and the openings 814 in a similar manner to the shelf feature 710 described with respect to FIGS. 7C and 7D.

In some cases, the second segment 112-2 defines a threaded hole 816 proximate the opening 802. Instead of the molded element 104-1 filling the threaded hole 816, the molded element 104-1 may define a corresponding through-hole that is aligned with the threaded hole 816. A threaded fastener may be used to secure the molded element 104-1 to the second segment 112-2, as shown in greater detail with respect to FIG. 9.

Figure 9:
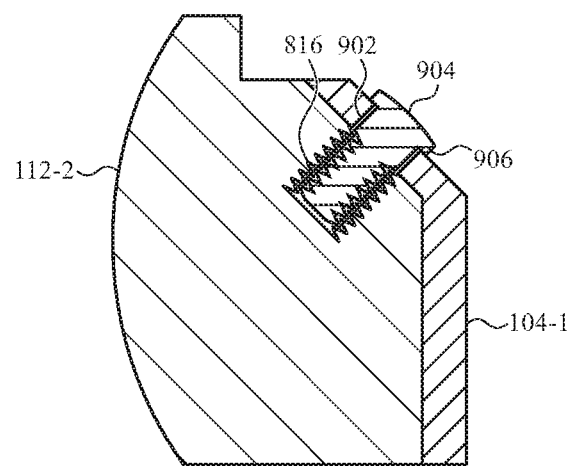
FIG. 9 depicts a partial cross-sectional view of a housing for an electronic device.

FIG. 9 depicts an example cross-sectional view of the housing 102, viewed along line G-G in FIG. 8. While FIG. 8 shows only the housing member 101, however, FIG. 9 also depicts the molded element 104-1 with a through-hole 902, and a threaded fastener 904 extending through the through-hole 902 and engaged with the threaded hole 816 in the second segment 112-2. The fastener 904 may include a head 906, and the molded element 104-1 may be captured between the head 906 and the second segment 112-2. The force applied by the head 906, which compresses the molded element 104-1 between the head 906 and the second segment 112-2, retains the molded element 104-1 to the second segment 112-2 (and the housing member 101 more generally).

In other cases, the second segment 112-2 defines interlock features with which the molded element 104-1 engages, similar to other retention features described herein. For example, the second segment 112-2 may define holes, recesses, threaded holes, posts, protrusions, undercuts, angled holes, or any other suitable interlock feature, and the molded element 104-1 may engage those engagement features by at least partially filling, at least partially surrounding, or otherwise engaging and/or interlocking with the interlock features to help retain the molded element 104-1 to the housing member 101.

The features and concepts described herein may be implemented in device housings that have antenna structures formed in a monolithic housing member, such as the housing member 101. The features and concepts may also be implemented in device housings in which multiple discrete components are joined together to define the housing, such as in the housings shown in FIGS. 10A-10B.

Figure 10A:
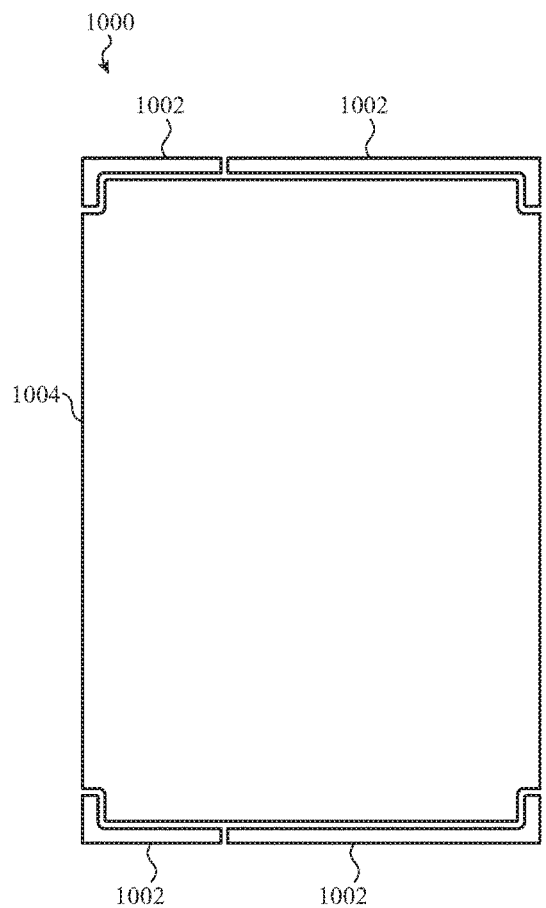
FIGS. 10A-10B depict example housings for electronic devices.

FIG. 10A depicts an example housing 1000 for an electronic device (e.g., a tablet computer). The housing 1000 may be similar in overall shape as the housing member 101 described herein, except the second segments 1002 are separate components from the first segment 1004. The second segments 1002 may be secured to the first segment via a molded element (which may be the same as or similar to the molded elements 104 described herein). In some cases, the first segment 1004 and the second segments 1002 include interlock and/or retention features with which the molded element engages to retain the second segments 1002 to the first segment 1004. As noted above, the molded element may be substantially nonconductive, and may electrically isolate the first segment 1004 from the second segments 1002, while also mechanically joining or retaining the second segments 1002 to the first segment 1004. All or some of the second segments 1002 may be used as antennas for a device, and the first and/or second segments 1004, 1002 may include features that tune a capacitive coupling between the segments. For example, the first segment 1004 and/or any of the second segments 1002 may include recesses such as the recesses 305 and/or the recess 806, described herein.

Figure 10B:
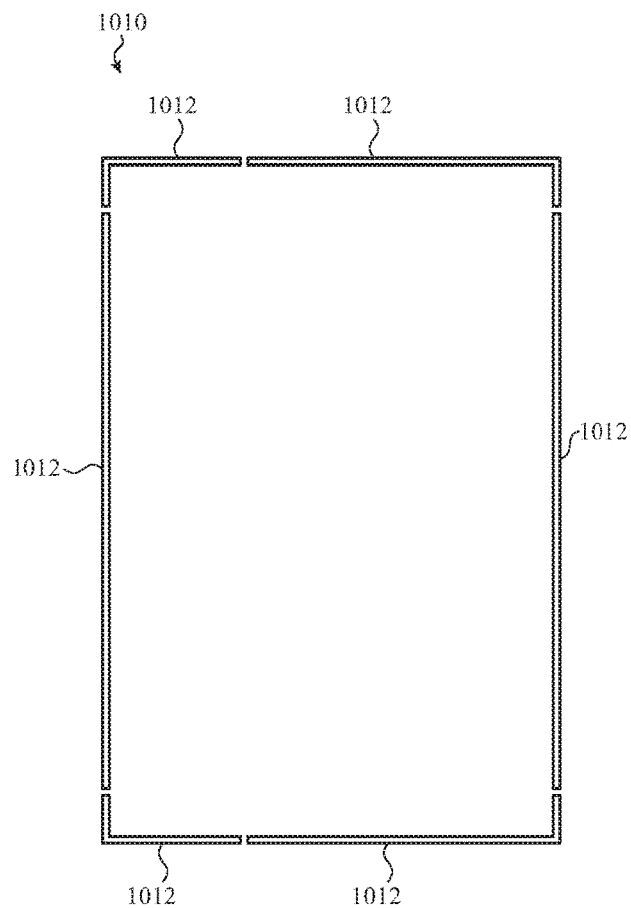

FIG. 10B depicts an example housing 1010 for an electronic device (e.g., a tablet computer). Whereas the housing 1000 includes a first segment 1004 that defines a back wall of a device (and, along with the second segments 1002, define side walls of the device), the housing 1010 may be a frame that substantially only defines side walls of a device. The back and front walls may be defined by other members or components that are coupled to the housing 1010, such as transparent covers (e.g., glass, plastic, sapphire, polycarbonate, etc.), plates (formed of metal, plastic, composite, and/or other materials), or the like. In some cases, both a front and back wall may be defined by a transparent cover, and either or both of the front and back wall may have an underlying display (e.g., a touch- and/or force-sensitive display, or a display without a sensor).

The housing 1010 may include segments 1012 that may be secured together via one or more molded elements (which may be the same as or similar to the molded elements 104 described herein). In some cases, the segments 1012 include interlock and/or retention features with which the molded element(s) engage to retain the segments 1012 together. As noted above, the molded element may be substantially nonconductive, and may electrically isolate adjacent segments 1012 from one another, while also mechanically joining or retaining adjacent segments 1012 to one another. All or some of the segments 1012 may be used as antennas for a device, and the segments 1012 may include features that tune the capacitive coupling between the segments, or between a given segment 1012 and another component of a device (e.g., another housing member, a structural frame, an internal circuit or other electrical component, or the like). For example, any of the segments 1012 may include recesses such as the recesses 305 and/or the recess 806, described herein.

Figure 11:
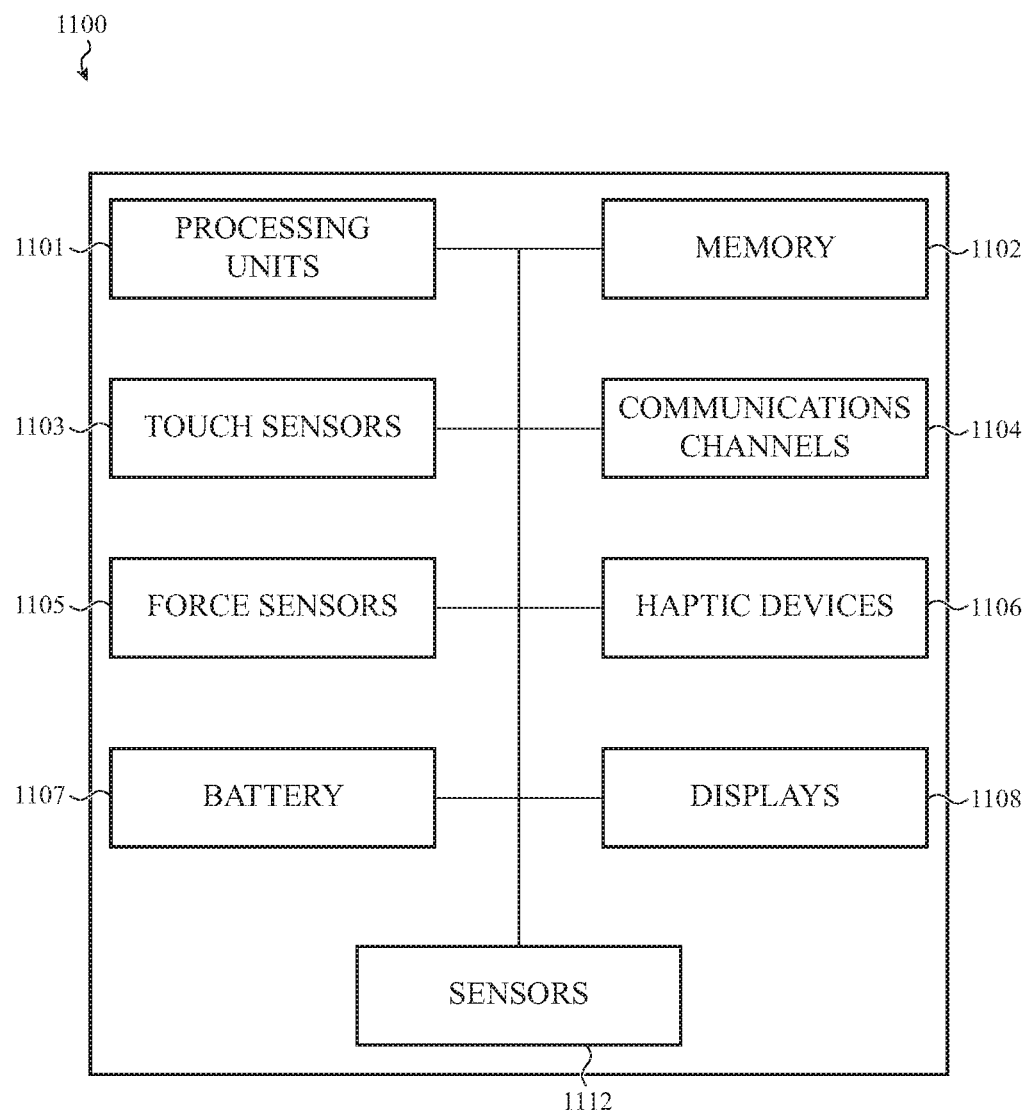
FIG. 11 depicts a schematic diagram of an example electronic device.

FIG. 11 depicts an example schematic diagram of an electronic device 1100. By way of example, the device 1100 of FIG. 11 may correspond to the electronic device 100 shown in FIGS. 1A-1D (or any other electronic device described herein). To the extent that multiple functionalities, operations, and structures are disclosed as being part of, incorporated into, or performed by the device 1100, it should be understood that various embodiments may omit any or all such described functionalities, operations, and structures. Thus, different embodiments of the device 1100 may have some, none, or all of the various capabilities, apparatuses, physical features, modes, and operating parameters discussed herein.

The device 1100 includes one or more processing units 1101 that are configured to access a memory 1102 having instructions stored thereon. The instructions or computer programs may be configured to perform one or more of the operations or functions described with respect to the device 1100. For example, the instructions may be configured to control or coordinate the operation of one or more displays 1108, one or more touch sensors 1103, one or more force sensors 1105, one or more communication channels 1104, one or more cameras 1111, one or more sensors 1112, and/or one or more haptic feedback devices 1106.

The processing units 1101 of FIG. 11 may be implemented as any electronic device capable of processing, receiving, or transmitting data or instructions. For example, the processing units 1101 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 1102 can store electronic data that can be used by the device 1100. For example, a memory can store electrical data or content such as, for example, audio and video files, images, documents and applications, device settings and user preferences, timing and control signals or data for the various modules, data structures or databases, and so on. The memory 1102 can be configured as any type of memory. By way of example only, the memory can be implemented as random access memory, read-only memory, Flash memory, removable memory, or other types of storage elements, or combinations of such devices.

The touch sensors 1103 may be configured to determine a location of a touch on a touch-sensitive surface of the device 1100 (e.g., an input surface defined by the cover 106). The touch sensors 1103 may use any suitable components and may rely on any suitable phenomena to detect physical inputs. For example, the touch sensors 1103 may use or include capacitive sensors, resistive sensors, surface acoustic wave sensors, piezoelectric sensors, strain gauges, or the like. The touch sensors 1103 may include any suitable components for detecting touch-based inputs and generating signals or data that are able to be accessed using processor instructions, including electrodes (e.g., electrode layers), physical components (e.g., substrates, spacing layers, structural supports, compressible elements, etc.) processors, circuitry, firmware, and the like. In some cases the touch sensors 1103 associated with a touch-sensitive surface of the device 1100 may include a capacitive array of electrodes or nodes that operate in accordance with a mutual-capacitance or self-capacitance scheme. The touch sensors 1103 may be integrated with one or more layers of a display stack (e.g., the display 107) to provide the touch-sensing functionality of a touchscreen. The touch sensors 1103 may operate in conjunction with the force sensors 1105 to generate signals or data in response to touch inputs.

The force sensors 1105 may detect various types of force-based inputs and generate signals or data that are able to be accessed using processor instructions. The force sensors 1105 may use any suitable components and may rely on any suitable phenomena to detect physical inputs. For example, the force sensors 1105 may be strain-based sensors, piezoelectric-based sensors, piezoresistive-based sensors, capacitive sensors, resistive sensors, or the like. The force sensors 1105 may include any suitable components for detecting force-based inputs and generating signals or data that are able to be accessed using processor instructions, including electrodes (e.g., electrode layers), physical components (e.g., substrates, spacing layers, structural supports, compressible elements, etc.) processors, circuitry, firmware, and the like. The force sensors 1105 may be used in conjunction with various input mechanisms to detect various types of inputs. For example, the force sensors 1105 may be used to detect presses or other force inputs that satisfy a force threshold (which may represent a more forceful input than is typical for a standard "touch" input). Like the touch sensors 1103, the force sensors 1105 may be integrated with or otherwise configured to detect force inputs applied to any portion of the device 1100. The force sensors 1105 may be integrated with one or more layers of a display stack (e.g., the display 107) to provide force-sensing functionality of a touchscreen.

The device 1100 may also include one or more haptic devices 1106. The haptic device 1106 may include one or more of a variety of haptic technologies such as, but not necessarily limited to, rotational haptic devices, linear actuators, piezoelectric devices, vibration elements, and so on. In general, the haptic device 1106 may be configured to provide punctuated and distinct feedback to a user of the device. More particularly, the haptic device 1106 may be adapted to produce a knock or tap sensation and/or a vibration sensation. Such haptic outputs may be provided in response to detection of touch and/or force inputs, and may be imparted to a user through the exterior surface of the device 1100 (e.g., via a glass or other surface that acts as a touch- and/or force-sensitive display or surface).

The one or more communication channels 1104 may include one or more wireless interface(s) that are adapted to provide communication between the processing unit(s) 1101 and an external device. In general, the one or more communication channels 1104 may be configured to transmit and receive data and/or signals that may be interpreted by instructions executed on the processing units 1101. In some cases, the external device is part of an external communication network that is configured to exchange data with wireless devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, infrared interfaces, USB interfaces, Wi-Fi interfaces, TCP/IP interfaces, network communications interfaces, or any conventional communication interfaces. The communications channels 1104 may be configured to use components of the device housing (e.g., the second segments 112) as antennas to send and/or receive wireless communications.

As shown in FIG. 11, the device 1100 may include a battery 1107 that is used to store and provide power to the other components of the device 1100. The battery 1107 may be a rechargeable power supply that is configured to provide power to the device 1100 while it is being used by the user.

The device 1100 may also include one or more displays 1108. The displays 1108 may use any suitable display technology, including liquid crystal displays (LCD), an organic light emitting diodes (OLED), active-matrix organic light-emitting diode displays (AMOLED), or the like. If the displays 1108 use LCD technology, the displays 1108 may also include a backlight component that can be controlled to provide variable levels of display brightness. If the displays 1108 include OLED or LED technologies, the brightness of the displays 1108 may be controlled by modifying the electrical signals that are provided to display elements. The displays 1108 may correspond to any of the displays shown or described herein (e.g., the display 107).

The device 1100 may also include one or more additional sensors 1112 to receive inputs (e.g., from a user or another computer, device, system, network, etc.) or to detect any suitable property or parameter of the device, the environment surrounding the device, people or things interacting with the device (or nearby the device), or the like. For example, a device may include accelerometers, temperature sensors, position/orientation sensors, biometric sensors (e.g., fingerprint sensors, photoplethysmographs, blood-oxygen sensors, blood sugar sensors, or the like), eye-tracking sensors, retinal scanners, humidity sensors, buttons, switches, lid-closure sensors, or the like.

To the extent that multiple functionalities, operations, and structures described with reference to FIG. 11 are disclosed as being part of, incorporated into, or performed by the device 1100, it should be understood that various embodiments may omit any or all such described functionalities, operations, and structures. Thus, different embodiments of the device 1100 may have some, none, or all of the various capabilities, apparatuses, physical features, modes, and operating parameters discussed herein.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. An electronic device comprising:
a housing comprising:
a main housing portion defining:
a portion of a back surface of the housing;
a first portion of a first side surface of the housing; and
a first portion of a second side surface of the housing; and
a u-shaped housing portion comprising a first metal housing segment and a second metal housing segment and defining:
a top side surface of the housing;
a second portion of the first side surface of the housing; and
a second portion of the second side surface of the housing; and
a molded polymer element positioned between the main housing portion and the u-shaped housing portion and extending along the first side surface of the housing, the back surface of the housing, and the second side surface of the housing;
a cover coupled to the housing; and
a display positioned below the cover and configured to produce graphical outputs visible through the cover.

2. The electronic device of claim 1, wherein the first metal housing segment is configured to function as an antenna.

3. The electronic device of claim 2, wherein:
the antenna is a first antenna; and
the second metal housing segment is configured to function as a second antenna.

4. The electronic device of claim 3, wherein the first antenna is configured to operate at a first frequency band and the second antenna is configured to operate at a second frequency band different from the first frequency band.

5. The electronic device of claim 1, wherein:
the portion of the back surface of the housing is a first portion of the back surface of the housing; and
the u-shaped housing portion further defines a second portion of the back surface of the housing.

6. The electronic device of claim 1, wherein the molded polymer element is further positioned between the first metal housing segment and the second metal housing segment.

7. The electronic device of claim 1, wherein:
the first metal housing segment is coupled to the main housing portion via a first metal bridge segment; and
the second metal housing segment is coupled to the main housing portion via a second metal bridge segment.

8. A tablet computing device comprising:
a display;
a cover assembly defining at least a portion of a front surface of the tablet computing device; and
a housing at least partially enclosing the display and comprising:
a first housing segment defining:
a first portion of a back surface of the housing;
a first portion of a first side surface of the housing; and
a first portion of a second side surface of the housing;
a first corner segment defining a second portion of the first side surface of the housing and a first portion of a top surface of the housing;
a second corner segment defining a second portion of the second side surface of the housing and a second portion of the top surface of the housing; and
a molded element defining a third portion of the first side surface of the housing, a third portion of the second side surface of the housing, and a second portion of the back surface of the housing.

9. The tablet computing device of claim 8, wherein the molded element comprises a polymer material and is positioned in a first gap defined between the first corner segment and the first housing segment and in a second gap defined between the second corner segment and the first housing segment.

10. The tablet computing device of claim 9, wherein the molded element is further positioned in a third gap defined between the first corner segment and the second corner segment.

11. The tablet computing device of claim 8 wherein the first housing segment, the first corner segment, and the second corner segment are a unitary metal structure.

12. The tablet computing device of claim 8, wherein the molded element further defines a third portion of the top surface of the housing.

13. The tablet computing device of claim 8, wherein the first portion of the top surface of the housing is longer than the second portion of the top surface of the housing.

14. The tablet computing device of claim 8, wherein:
the first corner segment operates as a first antenna; and
the second corner segment operates as a second antenna.

15. A portable electronic device comprising:
a touch-sensitive display;
a cover positioned over the touch-sensitive display and defining a front surface of the portable electronic device; and
a housing coupled to the cover and at least partially enclosing the touch-sensitive display and comprising:
a main housing portion defining a first portion of a back surface of the portable electronic device;
a u-shaped housing portion comprising:
a first corner segment defining a portion of a first side surface of the portable electronic device and a first portion of a top surface of the portable electronic device; and
a second corner segment defining a portion of a second side surface of the portable electronic device and a second portion of the top surface of the portable electronic device; and
a molded polymer member defining:
a first segment positioned between the main housing portion and the u- shaped housing portion and defining a second portion of the back surface of the portable electronic device; and
a second segment positioned between the first corner segment and the second corner segment and defining a third portion of the top surface of the portable electronic device.

16. The portable electronic device of claim 15, wherein:
the u-shaped housing portion is a first u-shaped housing portion;
the portion of the first side surface is a first portion of the first side surface;
the portion of the second side surface is a first portion of the second side surface; and
the housing further comprises a second u-shaped housing portion comprising:
a third corner segment defining a second portion of the first side surface; and a fourth corner segment defining a second portion of the second side surface.

17. The portable electronic device of claim 15, wherein:
the molded polymer member is a first molded polymer member;
the u-shaped housing portion is a first u-shaped housing portion; and
the housing further comprises:
a second u-shaped housing portion; and
a second molded polymer member defining a segment positioned between the main housing portion and the second u-shaped housing portion.

18. The portable electronic device of claim 15, wherein the first corner segment, the second corner segment, and the main housing portion comprise aluminum.

19. The portable electronic device of claim 15 wherein:
the main housing portion defines an interlock feature; and
the molded polymer member at least partially encapsulates the interlock feature.

20. The portable electronic device of claim 15, wherein at least a portion of the first corner segment operates as an antenna.

\* \* \* \* \*